United States Patent [19]

Schumacher et al.

[11] 4,434,258

[45] Feb. 28, 1984

[54] ORGANIC ACID CONTAINING FILLED AND PLASTICIZED THERMOPLASTIC COMPOSITIONS BASED ON ETHYLENE INTERPOLYMERS

[75] Inventors: Frederick G. Schumacher, Wilmington, Del.; Walter Yllo, Carney's Point, N.J.

[73] Assignee: E. I. Du Pont de Nemours and Company, Wilmington, Del.

[21] Appl. No.: 339,468

[22] Filed: Jan. 15, 1982

[51] Int. Cl.$^3$ .......................... C08K 5/09; C08K 5/11; C08K 5/20

[52] U.S. Cl. ........................ 524/13; 524/15; 524/109; 524/210; 524/306; 524/311; 524/314; 524/315; 524/318; 524/321; 524/322; 524/399; 524/400; 524/423; 524/424; 524/427; 524/430; 524/431; 524/437; 524/439; 524/440; 524/445; 524/449; 524/451

[58] Field of Search ................. 524/322, 13, 522, 523, 524/528, 109

[56] References Cited

U.S. PATENT DOCUMENTS

| | | | |
|---|---|---|---|
| 3,484,405 | 12/1969 | Seto | 524/515 |
| 4,160,751 | 7/1979 | Bock et al. | 524/322 |
| 4,174,325 | 11/1979 | Pischtschan et al. | 524/322 |
| 4,180,490 | 12/1979 | Maclean | 524/322 |
| 4,191,798 | 3/1980 | Schumacher | 428/95 |
| 4,219,453 | 8/1980 | Sakurai et al. | 524/322 |
| 4,222,924 | 9/1980 | Schumacher | 524/445 |
| 4,263,196 | 4/1981 | Schumacher | 524/423 |

FOREIGN PATENT DOCUMENTS 2067576 7/1981 United Kingdom.

OTHER PUBLICATIONS

Chemical Abstracts, vol. 93, No. 2, Jul. 14, 1980, Abstract No. 9388k.

Chemical Abstracts, vol. 93, No. 24, Dec. 15, 1980, Abstract No. 221599z.

*Primary Examiner*—Ronald W. Griffin

[57] ABSTRACT

Filled thermoplastic compositions having enhanced elongation and useful, e.g., as sound-deadening sheeting for automotive carpet, are obtained by blending about 0–50% by weight of an ethylene interpolymer, such as ethylene/vinyl ester, ethylene/unsaturated mono- or dicarboxylic acids or esters of said unsaturated acids, etc.; 0–20% by weight of a plasticizer selected from the group consisting of processing oils, epoxidized oils, polyesters, polyethers, polyether esters and combinations thereof; about 40–90% by weight of filler; from about 0.05 to about 5.0% by weight of at least one organic acid or acid derivative selected from the group consisting of saturated polycarboxylic acids having from 6 to 54 carbon atoms, unsaturated mono- and dicarboxylic acids having from 12 to 20 carbon atoms, alicyclic and aromatic carboxylic acids, and mono-, di- and trivalent metal salts, esters and amides of said acids; and optionally modifying resins, such as tackifiers and certain ethylene and propylene homo- and copolymers.

18 Claims, No Drawings

ORGANIC ACID CONTAINING FILLED AND PLASTICIZED THERMOPLASTIC COMPOSITIONS BASED ON ETHYLENE INTERPOLYMERS

BACKGROUND OF THE INVENTION

1. Field of the Invention

This invention relates to filled and plasticized blends of ethylene interpolymers and more specifically it relates to such blends modified with organic acids.

2. Description of the Prior Art

Japanese Patent Publication 23128-1980 describes filled ethylene copolymer compositions (in particular, ethylene/ethyl acrylate; 5 to 30% ethyl acrylate) with 100 to 500 parts by weight of a inorganic filler which has been surface-treated with a titanate-based coupling agent (e.g. isopropyl triisostearyl titanate). The compositions which result are claimed to provide noticeably improved tensile strength, elongation at break, strechability, and heat shrinkage, vs. compositions which do not employ titanate-based coupling agents.

Japanese Patent Publication 21052-1980 describes a filled polymer composition which uses as raw materials a polymer mixture of (a) ethylene/vinyl acetate (EVA) copolymer, which contains from 10 to 28% vinyl acetate; (b) rubber, preferably chloroprene rubber or ethylene-propylene rubber, and (c) filler. The ratio of EVA:rubber is from 60:40 to 90:10. The mixture should contain 100 parts of polymer mixture and 150 parts of a high specific gravity filler. It may optionally contain other ingredients, such as dibutyl phthalate as a plasticizer, and stearic acid. It is intended for use in vacuum-molded sheet or in injection molded form for sound-deadening purposes.

U.K. patent application No. 2,067,576A describes a composition which contains three essential ingredients—10 to 25% of a thermoplastic resin component (such as ethylene/ethyl acrylate or ethylene/vinyl acetate copolymers), 4 to 15% of an olefinic elastomer (such as ethylene/propylene rubber; ethylene/propylene/diene rubber, or polyisobutylene/isoprene copolymer), and from 60 to 85% of a filler component, such as barium sulfate or calcium carbonate. Optional additional ingredients include 0.25 to 2.0% of stearic acid and stearates which allegedly function as a processing aid; 2 to 10% of a paraffinic or naphthenic hydrocarbon oil; tackifying resins; titanates or polymeric ester surface-treating aids, etc. Carpet constructions employing the above compositions are also disclosed. The compositions described in this application are alleged to offer unusually high flexibility as compared with blends known heretofore.

SUMMARY OF THE INVENTION

According to the present invention there is provided a composition consisting essentially of (a) from 0 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to about 95% by weight, the comonomer content of said copolymer being from about 5 to about 60% by weight, and the melt index of said copolymer being from about 0.1 to about 400, provided than when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; provided, that when the olefin polymer of paragraph (e) is absent, the amount of ethylene copolymer is at least about 5% by weight; (b) from 0 to about 20 percent by weight of at least one plasticizer selected from the group consisting of processing oils, epoxidized oils, polyesters, polyethers, and polyether esters; (c) from about 40 to about 90% by weight of filler; (d) from about 0.05 to about 5.0% by weight of at least one organic acid or acid derivative selected from the group consisting of saturated mono- and polycarboxylic acids having from 6 to 54 carbon atoms, unsaturated mono- and dicarboxylic acids having from 12 to 20 carbon atoms, alicyclic and aromatic carboxylic acids, and mono-, di- and trivalent metal salts, esters and amides of said organic acids; (e) from 0 to 55% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight provided, that when the ethylene copolymer of paragraph (a) is absent the amount of olefin polymer is at least about 5% by weight; and (f) from 0 to about 30% by weight of tackifier.

Further provided according to the present invention are the above compositions in the form of a sound-deadening sheet.

Still further provided according to the present invention are carpets and especially automotive carpets having a backside coating consisting essentially of the above composition.

As used herein the term "consisting essentially of" means that the named ingredients are essential, however, other ingredients which do not prevent the advantages of the present invention from being realized can also be included.

DETAILED DESCRIPTION OF THE INVENTION

The inclusion of a processing oil in highly loaded blends of ethylene-vinyl acetate (EVA) and filler has been described in U.S. Pat. No. 4,191,798. When the filler loading exceeded about 70%, the tensile elongation of the blend tended to drop sharply—to the undesirably low range of 15–30%. It has been found that inclusion of very small amounts of an acidic additive, such as a fatty acid or an analogous organic acid, will produce a remarkably and unexpectedly large increase in the tensile elongation value of the individual blend.

The ethylene copolymers suitable for the composition of the present invention are copolymers with at least one comonomer selected from the group consisting of vinyl esters of saturated carboxylic acids wherein the acid moiety has up to 4 carbon atoms, unsaturated mono- or dicarboxylic acids of 3 to 5 carbon atoms, salts of said unsaturated acids and esters of said unsaturated mono- or dicarboxylic acids wherein the alcohol moiety has 1 to 8 carbon atoms. Terpolymers of ethylene and the above comonomers are also suitable. In addition, terpolymers of ethylene/vinyl acetate/carbon monoxide or ethylene/vinyl acetate/sulfur dioxide containing up to about 15 percent by weight of carbon monoxide or sulfur dioxide can also be employed.

The ethylene content of the copolymer is from about 40 to about 95% by weight, and the comonomer content is from about 5 to about 60% by weight. The preferred ethylene and comonomer level is from about 45 to about 91% and from about 9 to about 55% by weight, respectively. The most preferred ethylene and comonomer content is from about 88 to about 72% and from about 12 to about 28%, respectively. A mixture of two or more ethylene copolymers can be used in the blends of the present invention in place of a single copolymer as long as the average values for the comonomer content will be within the above indicated range.

Employing a copolymer containing over 28% nonethylenic comonomer (such a vinyl acetate) results in blends that are less stiff and have lower tensile strength, while their elongation is increased. The most preferred level is about 12 to 28 weight percent. Below 12% vinyl acetate, the blends become much stiffer, lose elongation, and oil compatability problems may arise. Even blends made with nonbleeding oils tend to become "oily" as polyethylene homopolymer is approached.

Melt index of the copolymer can range from about 0.1 to about 400, preferably from about 0.1 to about 50. Physical properties, principally elongation, decline to lower levels when the ethylene copolymer melt index is above about 50. Lower melt index ranges, from about 1 to about 10, are most preferred to maintain strength.

Generally from about 5 to about 50% by weight of ethylene copolymer is employed in the composition of the present invention, preferably from about 8 to about 35% by weight, and most preferably from about 12 to about 25% by weight.

Particularly useful properties can be obtained when two properly-selected ethylene copolymers are used in blends of the present invention. By combining at least two different properly selected EVA copolymer grades, copolymers (A) and (B), with filler, plasticizer, and an organic acid, unexpected and unusual modification of the physical properties of the filled composition can be achieved as compared with compositions containing only a single EVA resin grade. Most significantly, by replacing a single EVA grade in a filled blend with an equal amount of a properly selected mixture of two EVA grades, where the mixture has the same weight percent vinyl acetate content and melt index as the single EVA grade replaced, the tensile elongation can be increased substantially.

The polar comonomer (such as vinyl acetate) content of the first copolymer, copolymer (A), is from about 2 to about 30 percent by weight. The polar comonomer content of the second copolymer, copolymer (B), is from about 28 to about 60 percent by weight, provided that the polar comonomer content of the second copolymer is at least 12 weight percent greater than the polar comonomer content of the first copolymer. The balance of copolymers (A) and (B) is made up by ethylene.

The polar comonomer content of the first copolymer is preferably from about 5 to about 28 percent by weight, and the polar comonomer content of the second copolymer is preferably from about 30 to about 60 percent by weight, provided that the polar comonomer content of the second copolymer is at least 15 weight percent greater than the polar comonomer content of the first copolymer.

The most preferred polar comonomer content of the first copolymer is from about 10 to about 25 percent by weight, and the most preferred polar comonomer content of the second copolymer is from about 33 to about 60 percent by weight, provided that the polar comonomer content of the second copolymer is at least 18 percent greater than the polar comonomer content of the first copolymer.

The weight ratio of the first copolymer to the second copolymer in the compositions of the present invention can range from about 99/1 to about 55/45, preferably from about 97/3 to about 60/40, and most preferably from about 95/5 to about 65/35.

The melt index of the first copolymer can range from about 0.1 to about 20, preferably from about 0.3 to about 10, and most preferably from about 0.5 to about 2. The melt index of the second copolymer can range from about 5 to about 1000, preferably from about 10 to about 200, and most preferably from about 15 to about 100.

Generally, from about 5 to about 50 percent by weight of the mixture of the first copolymer and the second copolymer is employed in the composition of the present invention. Preferably from about 8 to about 35 percent by weight, and most preferably from about 12 to about 25 percent by weight is employed.

In accordance with the above, suitable ethylene copolymers are such as ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate.

Particularly suitable copolymers are ethylene/vinyl acetate, ethylene/ethyl acrylate, ethylene/methyl acrylate, ethylene/isobutyl acrylate, ethylene/methyl methacrylate, and ethylene/vinyl acetate/methacrylic acid.

The first group of plasticizer ingredient of the composition of the present invention is known as process or processing oil. Three types of processing oils are known—paraffinic, aromatic and naphthenic. None of these are pure; the grades identify the major oil type present.

Paraffinic oils tend to "bleed" from blends. Bleeding is normally not desirable, but could be useful in specialty applications, for example, in concrete forms where mold release characteristics are valued.

On the other hand, naphthenic acid aromatic oils are nonbleeding when used in proper ratios and are thus preferable for uses such as automotive carpet backsize.

Processing oils are also subdivided by viscosity range. "Thin" oils can be as low as 100–500 SUS (Saybolt Universal Seconds) at 100° F. (38° C.). "Heavy" oils can be a s high as 6000 SUS at 100° F. (38° C.). Processing oils, especially naphthenic and aromatic oils with viscosity of from about 100 to 6000 SUS at 100° F. (38° C.) are preferred.

The amount of plasticizer, such as the process oil, present in the composition of the present invention is from 0 to about 20% by weight, preferably from about 2 to about 15% by weight. Most preferably when using a filler of medium density, such as calcium carbonate, the amount of processing oil if from about 4 to about 10% by weight, and when using a filler of higher density, such as barium sulfate, the amount of processing oil is from about 3 to about 10% by weight.

In many cases, addition of processing oil in an amount of less than about 2% will not have a significant effect. Processing oil in excess of about 10% will cause the melt index to rise rapidly and the blend to become much softer. At extremes, for example, at 70% filler, over 15% oil and less than 15% EVA, the oil content overwhelms the blend as the amount of EVA present is not adequate to provide adequate strength for the blend.

In the selection of a process oil, other factors such as the type of oil selected and its viscosity must be considered. These are discussed in detail in U.S. Pat. No. 4,191,798, which is incorporated by reference.

The second group of plasticizers that are effective in the practice of the present invention is the group comprising epoxidized oils such as epoxidized soybean oil and epoxidized linseed oil.

The third group of plasticizers that are effective are the polyesters, which, in general, are liquid condensation products of a polybasic acid and a polyol. The term "liquid" in the context of the present invention is used to mean pourable at room temperature. The acid component is most often a saturated aliphatic dibasic acid or an aromatic dibasic acid; adipic acid, azelaic acid, phthalic acid, sebacic acid, and glutaric acid, or mixtures thereof. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic dibasic acids, and a polyol component of aliphatic polyol or even more preferably aliphatic glycol. Most preferred compositions are based on adipic or azelaic acid, and propylene glycol or 1,3- or 1,4-butane glycol. The molecular weight of these plasticizers can vary from a low of a few hundred up to a high of about 10,000. The molecular weight of commercial products is seldem specified. Typically in the trade, the molecular weight range of the product is classified as low, medium, or high. The preferred range for purposes of this invention is that classified as medium.

Mixtures of polyesters with hydrocarbon oils are also effective plasticizers in the present invention. One objective of using such as mixture is to couple the high efficiency of the relatively high cost polyester with the low cost of the hydrocarbon oil. The cost-performance of a compound plasticized with such a mixture can be improved significantly for a given application because properties can be tailored more precisely, or filler levels can be increased. Actually certain advantages in the performance of the blends of the present invention are obtained as will be discussed below, when such a mixture is used as the plasticizer.

When used alone, the amount of polyester plasticizer in the composition of the present invention is from about 1 to about 15% by weight, preferably from about 2 to about 12% by weight.

Where a mixture of the polyester plasticizer and a hydrocarbon oil is employed, the relative proportions of the two components can be varied over a wide range depending upon performance objectives. Mixtures containing 50% or less of the polyester are preferred for economic reasons, and most preferred are those containing 20% or less of the polyester.

A separate class of plasticizers, polyethers and polyether esters, are also effective plasticizers in blends of the ethylene copolymers and fillers described/above. In general, polyethers are oligomers or polymers of alkylene oxides; polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid to form the ester. Fatty acids such as lauric and stearic acids are commonly used; the most common examples of these compounds are the mono- and diesters of polyethylene or polypropylene glycol. The molecular weight of polyethers may range up to those typical of high polymers.

Preferred polyether compositions in the practice of this invention are those consisting of the polyols based on random and/or block copolymers of ethylene oxides and propylene oxides. The copolymer polyols provide better performance in terms of efficiency in compounds of the present invention containing very high levels of filler.

When used alone the amount of polyether plasticizer in the composition of the present invention is from about 1 to about 15% by weight, preferably from about 2 to about 12% by weight.

Mixtures of the polyether or the polyether ester plasticizers with either a polyester plasticizer or a hydrocarbon processing oil can also be used in the practice of this invention. The advantage of polyether/polyester combination is the lower cost since the polyethers are cheaper than the polyesters. Combinations of polyether and processing oil are also cheaper because of the lower cost of the oil.

The relative proportions of the two components in a polyether/polyester combination will be adjusted according to the efficiency of the system based on property requirements and cost. Those based primarily on polyester will not be as stiff and will be more expensive, for example, than those based primarily on a polyether or polyether ester.

Where a mixture of the polyether or polyether ester and a hydrocarbon oil is employed, the relative proportions used will again depend upon cost and property requirements. Since the polyethers are more expensive than the processing oils, mixtures containing 50% or less of the polyethers are preferred.

As referred to above a mixture of processing oil, on the one hand, and epoxidized oil, polyester or polyether or polyether ester, or any combination thereof, on the other hand, can also be used very effectively as the plasticizer for the compositions of the present invention. In fact, such a two- or more component plasticizer system, comprising from about 50 to about 95 percent by weight of processing oil, gives higher tensile elongation than can be obtained using either plasticizer alone at the same level. Maximum elongation is achieved using a mixture of processing oil and polyester or polyether or polyether ester or any combination thereof comprising from about 50 to about 80 percent by weight of processing oil.

Where a mixture of plasticizers is used, the amount of plasticizer may range from about 2 to about 15% by weight, preferably from about 4 to about 12% by weight. Most preferably when using a filler of medium density, such as calcium carbonate, the amount of plasticizer is from about 5 to about 10% by weight, and when using a filler of higher density, such as barium sulfate, the amount of plasticizer is from about 4 to about 8% by weight.

The third essential ingredient of the composition of the present invention is the filler. The percentage of filler that can be included in the composition of the present invention on a weight basis is primarily a function of the density of the filler. Particle size and shape of the filler also will have an effect on properties of blends. Fine particle size fillers generally have a tendency to result in higher blend viscosities and they are also more expensive. No. 9 Whiting which has been used extensively in the present compositions (about 95% through 325 mesh) represents a viable midpoint in coarseness, availability, and cost. More preferred fillers are calcium carbonate and barium sulfate. The amount of filler present in the composition of the present invention is from about 40 to about 90% by weight, preferably from about 55 to about 90% by weight. Most preferably, when using a filler of medium density, such as calcium carbonate, the amount of filler is from about 65 to about 85% by weight, and when using a filler of higher density, such as barium sulfate, the amount of filler is from about 70 to about 90% by weight.

When the ethylene interpolymer employed in the composition of the present invention is an ethylene/vinyl ester copolymer, such as ethylene/vinyl acetate, and when the filler employed in combination therewith is clay, such as "SUPREX" Clay, it is necessary to add oil to the blend in order to passivate the clay. Proper sequencing of the addition of the ingredients is necessary to attain success in the mixing operation. Sequence A, below, during intensive mixing will be successful; while Sequence B may fail, if the EVA/clay mixture is heated before the clay is passivated because of the decomposition of the EVA copolymer caused by the clay. Decomposition is accompanied by liberation of anhydrous acetic acid and discoloration of the blend.

Sequence A: "X"—Clay—"Y"—OIL—Mix—EVA—Mix.
Sequence B: "X"—Clay—EVA—Mix—Oil—"Y'"—Mix.

In the above illustration, "X" and "Y" may be either nothing or other fillers, diluents or resins that do not influence the otherwise probable adverse reaction of the EVA with untreated clay. The above passivation of clay, in order to enable use of substantial amounts of clay in ethylene/vinyl ester blends, is the subject matter of U.S. Pat. No. 4,222,924. Further details on the effect of particle size of the filler on blend properties is given in U.S. Pat. No. 4,263,196.

In addition to the fillers mentioned above, incorporation of many other types is, of course, possible without altering the fundamentals taught in this patent. For example, inclusion of alumina trihydrate (hydrated alumina-$Al_2O_3.3H_2O$) is highly desirable when flame-retardant or low-smoke-tendency blends are desired. Heavy fillers, such as powdered iron or lead, or oxides of them, can be employed when ultra-dense blends are desired. Similarly, minerals having low density, such as magnesium carbonate, calcium sulfate, silica, flyash, and cement dust, or organic fillers such as yarns, wood flour, nut shells, rice hulls etc., can be employed when light-density blends are preferable. Finally, fillers with varied aspect ratios, such as talc, mica, from highly acicular (wollastonite, etc.) to round (glass beads, etc.) can also be employed to alter tensile strength/elongation relationships.

The final essential ingredient for the subject blend is an organic acid of the proper type. Organic acids over a wide range of saturated acid types, from $C_6$ monobasic saturated carboxylic acids such as caproic to long-chain types such as $C_{22}$ (behenic) fatty acids are highly effective in enhancing elongation and in increasing melt index at very low concentrations. A concomitant decrease in blend stiffness is generally also attained, as shown in examples which follow. In addition to monomeric organic acids, the so-called "dimer" and "trimer" acids (dimers and trimers of the simpler straight-chain forms) having up to 54 carbon atoms are also highly effective. Mixtures of the above mentioned acids may be employed, as may mixtures of any of the acid types disclosed herein.

In addition to the acids listed above, saturated polybasic acids are also effective. In this instance, when an acid such as azelaic acid ($C_9$, saturated, dibasic; $HOOC.(CH_2)_7.COOH$) is employed, the elongation values for blends will be markedly improved, the stiffness will be reduced, but the melt index will be virtually unchanged. Thus, the compounder is afforded an added tool for securing a desired balance of properties.

Further, mono- or polyunsaturated organic acids, including the $C_{12}$–$C_{20}$ mono- and dicarboxylic acids, and, in particular, oleic acid (monounsaturated $C_{18}$-type fatty acid) are also highly effective.

Cyclic organic acid "analogs" of the fatty acids are also effective means for practicing this invention. Both alicyclic (i.e., saturated) and aromatic (unsaturated, benzene-related ring structures with carboxylic group) were found to be effective in providing the benefits of this invention. However, the common acids of this type may often be acrid and of doubtful thermal stability; hence, care must be taken in their selection and conditions of use.

Mono-, di- and trivalent metal salts of organic acids, in particular the calcium and zinc salts of fatty acids, are very effective in carrying out the purposes of this invention. Esters and amides of the organic acids are also effective.

The number of organic acids in existence is enormous; the examples named above can be replaced by other close analogs with good results and without departing from the spirit of this invention.

The preferred organic acids are selected from the group consisting of saturated mono-, di- and tricarboxylic acids having from 6 to 54 carbon atoms, unsaturated mono- and dicarboxylic acids having from 12 to 20 carbon atoms, and zinc and calcium salts of said acids.

The most preferred organic acids are selected from the group consisting of palmitic, stearic and oleic acids, dimers and trimers thereof, and mixtures of these acids.

In using organic acids of the types described in the compositions of this invention the amount is from about 0.05 to about 5% by weight, and preferably from about 0.1 to about 2%. Most preferably, when using a fatty acid which is particularly effective, the amount is from about 0.12% to about 0.5%.

Polymers, both homo- and copolymers, other than the ones referred to above, can also be used to some extent in combination with the above specified polymers without significantly interfering with the advantages obtained by the present invention. These include, but without limitation, polymers such as ethylene/carbon monoxide and ethylene/sulfur dioxide. Similarly other ingredients can also be added to the compositions of the present invention by a compounder in order to obtain some desired effect, such as reduction of cost, or enhancement of a physical property. Accordingly, extender resins, waxes, foaming agents, crosslinking agents, antioxidants, etc. that are widely used, particularly in hot melts, can be included in the compositions of the present invention. Illustrative examples of several special additives and of potentially desirable resin ingredients are given below.

The basic blends described above are essentially free of surface tack at ambient temperature. Even if made with a "bleeding" type of paraffinic oil, the final sheet, at ambient temperature, may be slippery to the touch but will not be tacky. (Of course, as temperatures are increased to the 200° F.–250° F. level, the blends will be progressively softened and will adhere well to many substrates.) From time to time, compounders probably will want to produce sheeting with enhanced surface tack or adhesiveness. This can be done in the blends described in the present invention by incorporating a tackifier resin in the formulation. The tackifier may be any suitable tackifier known generally in the art such as those listed in U.S. Pat. No. 3,484,405. Such tackifiers include a variety of natural and synthetic resins and rosin materials. The resins which can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins employed function to provide substantial and improved tackiness of the composition. Suitable tackifiers include, but are not necessarily limited to the resins discussed below.

A class of resin components which can be employed as the tackifier composition hereof, are the coumarone-indene resins, such as the para coumarone-indene resins. Generally the coumarone-indene resins which can be employed have a molecular weight which ranges from about 500 to about 5,000. Examples of resins of this type which are available commercially include those materials marketed as "Picco"-25 and "Picco"-100.

Another class of resins which can be employed as the tackifier hereof are the terpene resins, including also styrenated terpenes. These terpene resins can have a molecular weight range from about 600 to 6,000. Typical commercially available resins of this type are marketed as "Piccolyte" S-100, as "Staybelite Ester" #10, which is a glycerol ester of hydrogenated rosin, and as "Wingtack" 95 which is a polyterpene resin.

A third class of resins which can be employed as the tackifier are the butadiene-styrene resins having a molecular weight ranging from about 500 to about 5,000. A typical commercial product of this type is marketed as "Buton" 100, a liquid butadiene-styrene copolymer resin having a molecular weight of about 2,500. A fourth class of resins which can be employed as the tackifier hereof are the polybutadiene resins having a molecular weight ranging from about 500 to about 5,000. A commercially available product of this type is that marketed as "Buton" 150, a liquid polybutadiene resin having a molecular weight of about 2,000 to about 2,500.

A fifth class of resins which can be employed as the tackifier are the so-called hydrocarbon resins produced by catalytic polymerization of selected fractions obtained in the refining of petroleum, and having a molecular weight range of about 500 to about 5,000. Examples of such resin are those marketed as "Piccopale"-100, and as "Amoco" and "Velsicol" resins. Similarly polybutenes obtained from the polymerization of isobutylene may be included as a tackifier.

The tackifier may also include rosin materials, low molecular weight styrene hard resins such as the material marketed as "Piccolastic" A-75, disproportionated pentaerythritol esters, and copolymers of aromatic and aliphatic monomer systems of the type marketed as "Velsicol" WX-1232. The rosin which may be employed in the present invention may be gum, wood or tall oil rosin but preferably is tall oil rosin. Also the rosin material may be a modified rosin such as dimerized rosin, hydrogenated rosin, disproportionated rosin, or esters of rosin. Esters can be prepared by esterifying the rosin with polyhydric alcohols containing 2–6 alcohol groups.

A number of examples of suitable tackifiers is given in Table 13, below. These must be regarded only as typical examples, as literally hundreds of logical candidates exist. A more comprehensive listing of tackifiers which can be employed is provided in the TAPPI CA Report #55, February 1975, pages 13–20, inclusive, a publication of the Technical Association of the Pulp and Paper Industry, Atlanta, Ga., which lists well over 200 commercially available tackifier resins.

In use, the compounder generally will want to select an ethylene-based copolymer and a tackifier resin which will be mutually compatible; chemical similarities which will indicate compatibility can be used for guidance. For a few highly specialized uses, such as super-hot-tack, quick-stick blends, the compounder may well elect to use incompatible systems. Finally, the reverse effect may be sought—in such instances, where an unusually slippery surface is desired, incorporation of small amounts of a slip aid such as Armid O may prove beneficial (see Table 7, below).

In using tackifier resins, the amount used in compositions of this invention is from 0 to about 30% by weight of the blend; preferably from 0 to about 20% by weight; and, most preferably, from 0 to about 15% by weight.

The organic acid additives described in this specification are particularly helpful when one of the many commercially available polyethylenes is employed as a substitute for part or all of the ethylene copolymer of the blend. As polyethylenes (whether LDPE, LLDPE, or HDPE) do not "wet" fillers effectively, it is not practical to incorporate more then perhaps 10 to 20% filler into binary blends of PE and filler. However, as shown in Table 8, useful blends in which the polyethylene is the only resinous ingredient can be prepared by employing both a process oil and a fatty acid additive, Thus, the substitution of homopolymer for copolymer can cover the entire range from 0 to 100%. In practice, intermediate PE levels would be used in most commercial blends to attain a desired stiffness level, concomitant with other needed properties. The "ideal" level will, of necessity, vary according to the physical property desired.

The teachings above have dealt with several different potential polymeric ingredients on an "individual-ingredient" basis to outline contributions possible from widely varying resin or polymer types. It must be stressed that polymer ingredients of the above types can, of course, be mixed so that, for example, the compounder may elect to modify a simple four-component EVA/oil/filler/fatty acid composition by replacing part of the EVA with a small amount of tackifier for adhesivity. In addition part of the oil can be replaced with a polyester or polyether-type additive to attain highly effective plasticization with a lower total amount of plasticizer. Thus, the possible combinations and permutations available to a skilled compounder will be infinite, yet remain within the spirit and intent of this invention.

The blends of the present invention are thermoplastic in nature and therefore can be recycled after processing. The recycled material may also contain textile fibers, jute, etc. present in the trim obtained during production of the finished product (e.g., back-coated automotive carpet).

A commercially sized batch-type Banbury or equivalent intensive mixer is entirely suitable for preparing the compositions of the present invention. A Farrel continuous mixer ("FCM") is also an excellent mixing device. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizers should be pre-blended before addition to the other ingredients of the present invention. This will facilitate uniform distribution of each plasticizer component in the fnal composition and thus ensure that optimum properties are obtained. Similarly, since the amounts of organic acid employed generally is so small, less than 1% for many cases, it is important to be certain that the organic acid is thoroughly mixed into the final blend. If this is not done, highly erratic values for physical properties may result. Thus, it may often prove helpful to premix the organic acid into a portion of one of the other ingredients, e.g., a liquid organic acid may be premixed with the process oil or a solid organic acid may be premixed with an aliquot of the filler. If desired, the copolymer and the plasticizer(s) can be precompounded as a "Masterbatch" in a suitable intensive mixing device (e.g., Banbury mixer or screw extruder). This "Masterbatch" can then be compounded with the filler and the other remaining ingredients to produce the final composition. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Conn. Here, temperatures between 325° and 425° F. are effective. In both cases, a very low plasticizer level, say about 2-3%, may require higher temperatures, while plasticizer levels above about 7% may mix well at lower mixer temperatures. While not evaluated, it is expected that other devices for handling viscous mixes (MI of 0.1 to 20) should be entirely satisfactory—but in any case, prototype trials in advance are desirable.

Generally, changes in the sequence of addition of ingredients has not been found to be significant, provided that the final mixture is thoroughly fluxed to attain homogeneity.

Once blends are mixed, routine commercial practices may be used, such as underwater melt cutting plus drying or use of sheeting plus chopping methods, to produce a final pelletized product. Alternately, the hot mixture also may be immediately fabricated into a final form, e.g. sheeting, molding, etc.

Primary use for the compositions of the present invention will probably be in the sheeting field, particularly for low cost, dense, sound deadening structures. Outstanding characteristics such as improved "hand", "drape", reduced stiffness, higher elongation and reduced thickness of the extruded sheeting result from the compositions of the present invention.

Other uses are possible. The principal advantage of the blends of this invention is that certain physical properties, such as flexibility and toughness, which are typically reduced when fillers are added to polymers, can be maintained within useful limits over a broad range of filler concentrations. Thus, blends of this invention could be used in the manufacture of wire and cable compounds, of various molded parts, of sealants and caulks, or in other uses where flexibility and toughness are desired, coupled with the economies normally achieved by the incorporation of low cost fillers.

The blends of the present invention can readily be extruded onto a substrate, such as an automotive carpet, a foam, a fabric or a scrim material, or can be extruded or calendered as unsupported film or sheet. Depending upon the equipment used, and the compounding techniques employed, it is possible to extrude a wide range of film thickness, from below 20 mils to above 100 mils. This then provides industry with an opportunity to vary the amount of sound deadening to be attained by varying film thickness, density of blends, ratio of filler load to binder, and similar techniques well known in the art.

The sound deadening sheet produced may be used in various ways:

When applied to automotive carpet, blends described are an effective and economic means to deaden sound, while also simultaneously serving as a moldable support for the carpet.

When used in sheet form, especially when coated onto a fabric, the blends can be installed in other areas of an automobile, truck, bus, etc., such as side panels, door panels, roofing areas, dash insulators, etc.

In sheet form, blends may be used as drapes or hangings to shield or to surround a noisy piece of factory equipment such as a loom, a forging press, etc.

In laminated sheet form, blends, faced with another material, might be used to achieve both a decorative and a functional use—such as dividing panels in an open-format office.

The application of the compositions of the present invention in carpets, and particularly in autotive carpets, is essentially identical to the methods as already described in U.S. Pat. No. 4,191,798, the disclosure of which is hereby incorporated by reference.

The highly-filled compositions described herein may be processed industrially into final sheet or three-dimensional solid form by using standard fabricating methods well known to those skilled in the art. Thus, fabricating methods such as extrusion, calendering, injection or rotomolding, extrusion coating, sheet laminating, sheet thermoforming, etc. are all practical means for forming the compositions of this invention.

The examples which follow are given for the purpose of illustrating the present invention. All parts and percentages are by weight unless otherwise specified. In all examples, the ingredients were premixed in a one-gallon (about 3.8 l) can by shaking the contents manually for about 0.5 minutes. (Where liquid fatty acids are employed, it is often preferably to premix the very small amount of acid into the much larger volume of liquid plasticizer, separately, before adding the liquid to the one-gallon can, to ensure reaching homogeneity rapidly). The ingredients were then added to a Banbury-type laboratory-sized intensive high-shear mixer. Mix conditions used were fluxing for 3 minutes, at a temperature of about 325° to 375° F. (about 160° to 190° C.).

EXAMPLES 1 TO 11 AND COMPARATIVE EXAMPLE 1

Comparative Example 1 shows key properties for a typical highly filled thermoplastic composition based on ethylene/vinyl acetate (EVA) copolymer resin, a process oil, and calcium carbonate filler, as taught in U.S. Pat. No. 4,191,798. The stiffness value is about 75 grams; the Melt Index (MI) is about 2.2 dg/1 min, and the elongation is about 25%. The tensile strength is about 650 psi. The indicated MI and stiffness levels are well within practical useful ranges. The tensile strength is far higher than is needed for most industrial uses. However, the elongation is close to the minimum level which is acceptable for commercial sheeting. A lesser value, e.g. less than 10% elongation, means the sheet will probably tear on handling, unless costly special care is used. Thus, the average user would clearly prefer to sacrifice some degree of tensile strength in order to attain substantially better elongation and tear resistance.

It was found that addition of a very small amount of a fatty acid, such as lauric, palmitic, or stearic acids, etc., will produce an astoundingly large change in physical properties of the basic composition.

Examples 1-11, show that employing any one of eleven different fatty acids, in an amount of only 0.175 to 0.25% proved highly effective in enhancing the relatively low elongation value of the composition of Comparative Example 1. The composition and physical properties of the blends are summarized in Table 1. The fatty acids employed cover a wide range of compositions: from as few as 8 carbon atoms (caprylic acid) to as many as 22 carbon atoms (behenic acid); dimer and trimer acids (C-36 and C-54); monobasic and dibasic types; and saturated and unsaturated types.

It is remarkable to note that all of the above fatty acids produced a virtually identical result—that is, the elongation improvement averages over twentyfold, increasing from the 25% elongation found for Comparative Example 1 up to the 500% range. In all cases, other common charges were noted:

The stiffness of the strip was reduced by about ⅓.
The melt index of the blend nearly doubled for most compositions.
The tensile strength was reduced by about ⅓—but still, at the 350 psi level, was clearly high enough to perform well in most end uses.
The "toughness" of the blend—defined as the product of the tensile strength in PSI and the elongation in percent—has risen sharply. The "toughness" for Comparative Example 1 is about 650×25%, or slightly over 16,000. By contrast, the "toughness" for a typical blend for the remainder of Examples 1-11 is 350×500%, or about 175,000—clearly, a tenfold improvement, far in excess of what literature comments would lead one skilled in the art to expect.

The reduction in stiffness and increase in melt index values is also of considerable significance. As will be shown later, these shifts open the way to adding increased amounts of fillers, while maintaining the needed elongation and "toughness" for the blend.

Example 4, shows one other surprising result. While all other blend properties are comparable to those of Examples 1-3 and 5-11, the melt index for the blend of Example 4 is virtually identical to that of Comparative Example 1 and only 50% of that for Examples 1-3 and 5-11. The fatty acid used for the blend of Example 4 is a dibasic type, which probably forms more complex interaction products with the other ingredients, thus increasing the viscosity of the molten blend, as measured by the melt index test.

TABLE 1

EFFECT OF INCLUSION OF FATTY ACIDS AND DIMERS OR TRIMERS THEREOF IN BLENDS OF EVA - CaCO$_3$ - PROCESS OIL

| EXAMPLE NO | C-1 | 1 | 2 | 3 | 4 | 5 | 6 | 7 | 8 | 9 | 10 | 11 |
|---|---|---|---|---|---|---|---|---|---|---|---|---|
| EVA #1[1] | 16.2 | | | | | | | | | | | |
| EVA #2[2] | 4.0 | | | | | | | | | | | |
| "CIRCOSOL" 4240[3] | 7.3 | | | | | | | | | | | |
| No. 9 Whiting[15] | 72.5 | | | | | | | | | | | |
| F.A. #1[4] | | 0.25 | | | | | | | | | | |
| F.A. #2[5] | | | 0.25 | | | | | | | | | |
| F.A. #3[6] | | | | 0.25 | | | | | | | | |
| F.A. #4[7] | | | | | 0.25 | | | | | | | |
| F.A. #5[8] | | | | | | 0.25 | | | | | | |
| F.A. #6[9] | | | | | | | 0.25 | | | | | |
| F.A. #7[10] | | | | | | | | 0.25 | | | | |
| F.A. #8[11] | | | | | | | | | 0.25 | | | |
| F.A. #9[12] | | | | | | | | | | 0.175 | | |
| F.A. #10[13] | | | | | | | | | | | 0.175 | |
| F.A. #11[14] | | | | | | | | | | | | 0.175 |
| Physical Properties | | | | | | | | | | | | |
| MI[16] | 2.2 | 4.5 | 4.5 | 4.3 | 2.4 | 4.5 | 4.5 | 4.2 | 4.0 | 4.1 | 4.1 | 4.4 |
| SP. GR.[17] | 1.82 | 1.83 | 1.83 | 1.82 | 1.84 | 1.83 | 1.84 | 1.83 | 1.82 | 1.82 | 1.82 | 1.82 |
| Tensile Strength[18] | | | | | | | | | | | | |
| PSI | 650 | 400 | 350 | 360 | 360 | 355 | 330 | 360 | 350 | 350 | 340 | 320 |
| kPa | 4480 | 2760 | 2420 | 2480 | 2480 | 2420 | 2280 | 2480 | 2420 | 2420 | 2350 | 2210 |
| Elongation, %[18] | 25 | 550 | 520 | 540 | 430 | 530 | 510 | 550 | 525 | 470 | 470 | 520 |
| Thickness of Strip, | | | | | | | | | | | | |

TABLE 1-continued
EFFECT OF INCLUSION OF FATTY ACIDS AND DIMERS OR TRIMERS THEREOF IN BLENDS OF EVA - CaCO₃ - PROCESS OIL

| EXAMPLE NO | C-1 | 1 | 2 | 3 | 4 | 5 | 6 | 7 | 8 | 9 | 10 | 11 |
|---|---|---|---|---|---|---|---|---|---|---|---|---|
| mils | 62 | 60 | 61 | 59 | 59 | 59 | 58 | 59 | 59 | 58 | 59 | 59 |
| mm | 1.57 | 1.52 | 1.55 | 1.50 | 1.50 | 1.50 | 1.47 | 1.50 | 1.50 | 1.47 | 1.50 | 1.50 |
| Stiffness of strip, g[19] | 75 | 46 | 49 | 49 | 57 | 59 | 52 | 52 | 58 | 46 | 64 | 54 |

Footnotes for Table 1
[1] EVA #1 = "Elvax" 360 resin, E. I. du Pont de Nemours and Company, Inc., 25% VAc; 75% E; M.I. 2.0
[2] EVA #2 = "Elvax" 3120 resin, E. I. du Pont de Nemours and Company, Inc. 7.5% VAc; 92.5% E; M.I. 1.2
[3] "Circosol" 4240 - A naphthenic process oil, ex Sun Oil Company, ASTM type 103; 2525 SUS at 100° F.; approximate composition is $C_A = 21\%$ (aromatic); $C_N = 39\%$ (naphthenic); $C_P = 40\%$ (paraffinic)
[4] Fatty Acid (F.A.) #1 = Lauric Acid (C-12), saturated, monobasic, 43° C. Titer, Emery #652, ex Emery Industries, Inc.
[5] F.A. #2 = Palmitic Acid, saturated (C-16), monobasic, 53° C. titer, "Emersol" 110; ex Emery Industries, Inc.
[6] F.A. #3 - Stearic Acid, saturated, (C-18), monobasic, 68° C. titer, "Emersol" 153; ex Emery Industries, Inc.
[7] F.A. #4 - Azelaic Acid, saturated (C-9), dibasic, 98° C. titer, "Emerox" 1133, ex Emery Industries, Inc.
[8] F.A. #5 - Behenic Acid, saturated, (C-21), monobasic, 70° C. titer, "Hydrofol" 2260, ex Sherex Chemical Company, Inc. - Division of Schering A/G, Germany
[9] F.A. #6 - Mixed Rubber Grade Acid, stearic/palmitic/oleic; "Neo-Fat" 18–59, ex Armak Division of Akzona, Inc.
[10] F.A. #7 - Dimer Acid, (C-36), saturated, dibasic, liquid "Empol" 1014; ex Emery Industries, Inc.
[11] F.A. #8 - Trimer Acid, C-54, saturated, tribasic, liquid, "Empol" 1040, ex Emery Industries, Inc.
[12] F.A. #9 - Mixed Rubber Grade Acid, hydrogenated, "Industrene" R, ex Humko Sheffield Division of Kraft, Inc.
[13] F.A. #10 - Oleic Acid, C-18, unsaturated, liquid monobasic, "Industrene" 105, ex Humko Sheffield Division of Kraft, Inc.
[14] F.A. #11 - 50% Caprylic Acid, C-8 & C-10, saturated, liquid, monobasic, "Industrene" 365, ex Humko Sheffield Division of Kraft, Inc.
[15] No. 9 Whiting - Commercial Ground Limestone, CaCO₃, ex Georgia Marble Company.
[16] ASTM D1238, Procedure A, Condition E; units are dg/min.
[17] Referred to water.
[18] Tensile strength and elongation measurements made on Instron Tester using ASTM Method D1708 at crosshead speed of 2 in. (5.1 cm)/min. Samples are 0.876 in. (2.23 cm) × 0.187 in. (0.47 cm) in size, at strip thickness shown in table.
[19] Stiffness of strip measured by placing a 1 in. × 6 in. (2.54 cm × 15.2 cm) strip on a platform scale, and measuring the force required to make the ends of the test strip meet, at room temperature.

EXAMPLES 12 TO 17 AND COMPARATIVE EXAMPLE 2

The composition and physical properties of the blends are summarized in Table 2.

This table shows that the effect previously described is dependent on the concentration of the fatty acid. Comparative Example 1 contains no fatty acid. Examples 12, 13, 14 and 3 show the effects of increased concentration for Fatty Acid #3. At a concentration of 0.09%, a reduction in tensile strength was noted, but no change in stiffness or elongation occurred. Then, as the fatty acid level was raised to 0.12%, the previously noted dramatic shift for elongation occurred. The stiffness value, however, did not fall until 0.25% acid was used. The MI value started to rise at 0.15% acid content.

The most important change is, of course, the elongation enhancement—which was startling when the acid concentration was changed by only 0.03%, from 0.09% to 0.12%. Thus, for industrial uses, a range of 0.20 to 0.25% would seem optimum for blends of these Examples, as this provides a reasonable guaranty of a good result, without use of excessive quantities. Other compositions or filler levels might well result in a different optimum fatty acid concentration.

Similar changes in the blend properties are observed in Examples 15 and 11 containing Fatty Acid #11, at about the same concentrations.

Improved elongation values can be obtained by reformulation of the resin composition, for example, as shown in Comparative Example 2. Here, use of "resin alloy" technology has enhanced the elongation of the blend, as taught in copending patent application Ser. No. 273,420, filed June 15, 1981.

In this instance, the already rather good elongation can be nearly doubled by addition of 0.175% of fatty acid #7. However, at the 0.10% acid level, the properties of the compound are very close (equal, within experimental error) to those of Comparative Example 2.

Thus, again, an abrupt change in properties is shown, once a threshold value is exceeded.

TABLE 2
EFFECT OF VARYING THE CONCENTRATION OF FATTY ACIDS IN HIGHLY - FILLED EVA BLENDS

| EXAMPLE NO | 12 | 13 | 14 | 15 | C2 | 16 | 17 |
|---|---|---|---|---|---|---|---|
| EVA #1 | 16.2 | 16.2 | 16.2 | 16.2 | — | — | — |
| EVA #2 | 4.0 | 4.0 | 4.0 | 4.0 | — | — | — |
| EVA #3[1] | | | | | 2.7 | 2.7 | 2.7 |
| EVA #4[2] | | | | | 17.5 | 17.5 | 17.5 |
| "CIRCOSOL" 4240 | 7.3 | 7.3 | 7.3 | 7.3 | 7.3 | 7.3 | 7.3 |
| No. 9 Whiting | 72.5 | 72.5 | 72.5 | 72.5 | 72.5 | 72.5 | 72.5 |
| F.A. #3 | 0.09 | 0.12 | 0.15 | — | — | — | — |
| F.A. #11 | — | — | — | 0.10 | — | — | — |
| F.A. #7 | — | — | — | — | 0 | 0.10 | 0.175 |
| Physical Properties | | | | | | | |
| MI | — | — | 3.6 | — | 2.6 | — | 2.8 |
| Tensile Strength | | | | | | | |
| PSI | 390 | 420 | 440 | 520 | 380 | 350 | 410 |
| kPa | 2690 | 2900 | 3040 | 3590 | 2630 | 2420 | 2830 |
| Elongation, % | 32 | 440 | 540 | 36 | 320 | 290 | 490 |
| Thickness of Strip, | | | | | | | |
| mils | 60 | 60 | 60 | 58 | 58 | 59 | 58 |
| mm | 1.52 | 1.52 | 1.52 | 1.47 | 1.47 | 1.50 | 1.47 |
| Stiffness of strip, g | 80 | 80 | 75 | 60 | 61 | 66 | 61 |

Footnotes for Table 2
[1] EVA #3 = "Elvax" 150 resin, E. I. du Pont de Nemours and Company, Inc., 33% VAc; 67% E; 43 M.I.
[2] EVA #4 = "Elvax" 470 resin, E. I. du Pont de Nemours and Company, Inc., 18% VAc; 82% E; 0.7 M.I.

EXAMPLES 18 TO 22 AND COMPARATIVE EXAMPLES 3 TO 7

The composition and physical properties of the blends are summarized in Table 3. This table shows that the remarkable improvement afforded by addition of small amounts of a fatty acid to highly filled blends (75.0% level) is virtually independent of the vinyl acetate level for a given E/VA resin. The table compares 5 separate sets of blends, which, for any set, show the "without/with" effect of only 0.25% of Fatty Acid #3.

Thus, it is indicated that the addition of very small amounts of fatty acid enhances the elongation values for ethylene-based copolymers over a very broad range of comonomer levels. (See also Table 9 below, which shows excellent results in blends based on homopolymers, i.e., high-density polyethylene and linear low-density polyethylene).

index level of 25 (C-9 vs. Ex. 24)—where the elongation improvement was nearly fourfold. At low melt index levels (C-10 vs. Ex. 25; C-4 vs. Ex. 19; C-12 vs. Ex. 27; C-13 vs. Ex. 28), the improvement in elongation value

TABLE 3

EFFECT OF CHANGE OF VINYL ACETATE LEVEL IN PROCESS OIL - FILLER - FATTY ACID BLENDS

| EXAMPLE NO | C3 | 18 | C4 | 19 | C5 | 20 | C6 | 21 | C7 | 22 |
|---|---|---|---|---|---|---|---|---|---|---|
| EVA #5[1] | 18.5 | 18.5 | | | | | | | | |
| EVA #6[2] | | | 18.5 | 18.5 | | | | | | |
| EVA #1 | | | | | 18.5 | 18.5 | | | | |
| EVA #4 | | | | | | | 18.5 | 18.5 | | |
| EVA #7[3] | | | | | | | | | 1.85 | 1.85 |
| "CIRCOSOL" 4240[3] | 6.5 | 6.5 | 6.5 | 6.5 | 6.5 | 6.5 | 6.5 | 6.5 | 6.5 | 6.5 |
| No. 9 Whiting | 75.0 | 75.0 | 75.0 | 75.0 | 75.0 | 75.0 | 75.0 | 75.0 | 75.0 | 75.0 |
| F.A. #3 | 0 | 0.25 | 0 | 0.25 | 0 | 0.25 | 0 | 0.25 | 0 | 0.25 |
| Physical Properties | | | | | | | | | | |
| MI | — | 46.5 | 3.1 | 4.1 | — | 3.22 | — | 1.4 | — | 0.9 |
| SP. GR. 1.88 | 1.88 | 1.89 | 1.89 | 1.88 | 1.87 | 1.88 | 1.89 | 1.87 | 1.87 | |
| Tensile Strength | | | | | | | | | | |
| PSI | 90 | 60 | 390 | 360 | 500 | 450 | 920 | 400 | 1080 | 350 |
| kPa | 620 | 410 | 2690 | 2480 | 3450 | 3110 | 6350 | 2760 | 7450 | 2420 |
| Elongation, % | 110 | 790 | 50 | 700 | 30 | 640 | 17 | 530 | 18 | 340 |
| Thickness of Strip, | | | | | | | | | | |
| mils | 58 | 58 | 58 | 58 | 58 | 58 | 60 | 58 | 59 | 60 |
| mm | 1.47 | 1.47 | 1.47 | 1.47 | 1.47 | 1.47 | 1.52 | 1.47 | 1.50 | 1.52 |
| Stiffness of strip, g | 19 | 16 | 65 | 55 | 80 | 65 | 120 | 70 | 160 | 85 |

Footnotes for Table 3
[1]EVA #5 = "Elvax" 40 resin, E. I. du Pont de Nemours and Company, Inc., 40.5% VAc; 59.5% E, 57 M.I.
[2]EVA #6 = "Elvax" 265 resin, E. I. du Pont de Nemours and Company, Inc. 28% Vac, 72% E, 3 M.I.
[3]EVA #7 = "Elvax" 670 resin, E. I. du Pont de Nemours and Company, Inc., 12% VAc; 88% E; 2.5 M.I.

noted was from fourteen fold to over twentyfold.

TABLE 4

EFFECT OF CHANGE OF EVA MELT INDEX ON EVA - PROCESS OIL - FILLER - FATTY ACID BLENDS

| EXAMPLE NO | C8 | 23 | C9 | 24 | C10 | 25 | C11 | 26 | C12 | 27 | C13 | 28 | 29 |
|---|---|---|---|---|---|---|---|---|---|---|---|---|---|
| EVA #8[1] | 18.5 | 18.5 | — | — | — | — | — | — | — | — | — | — | — |
| EVA #9[2] | — | — | 18.5 | 18.5 | — | — | — | — | — | — | — | — | — |
| EVA #10[3] | — | — | — | — | 18.5 | 18.5 | — | — | — | — | — | — | — |
| EVA #11[4] | — | — | — | — | — | — | 20.2 | 20.2 | — | — | — | — | 20.2 |
| EVA #12[5] | — | — | — | — | — | — | — | — | 20.2 | 20.2 | — | — | — |
| EVA #4 | — | — | — | — | — | — | — | — | — | — | 20.2 | 20.2 | — |
| "CIRCOSOL" 4240 | 6.5 | 6.5 | 6.5 | 6.5 | 6.5 | 6.5 | 7.3 | 7.3 | 7.3 | 7.3 | 7.3 | 7.3 | 7.3 |
| No. 9 Whiting | 75 | 75 | 75 | 75 | 75 | 75 | 72.5 | 72.5 | 72.5 | 72.5 | 72.5 | 72.5 | 72.5 |
| F.A. #3 | 0 | 0.25 | 0 | 0.25 | 0 | 0.25 | 0 | 0.25 | 0 | 0.25 | 0 | 0.25 | 0.75 |
| Physical Properties | | | | | | | | | | | | | |
| MI | 78 | — | — | — | — | 7.5 | 138 | — | 3.8 | 5.8 | 1.5 | 2.0 | — |
| SP. GR. | 1.88 | 1.86 | 1.88 | 1.88 | 1.89 | 1.90 | 1.82 | 1.84 | 1.84 | 1.82 | 1.85 | 1.84 | 1.86 |
| Tensile Strength | | | | | | | | | | | | | |
| PSI | 370 | 135 | 370 | 150 | 380 | 400 | 490 | 215 | 750 | 310 | 860 | 480 | 410 |
| kPa | 2550 | 930 | 2550 | 1040 | 2620 | 2760 | 3380 | 1480 | 5180 | 2140 | 4930 | 3310 | 2830 |
| Elongation, % | 25 | 18 | 30 | 110 | 32 | 690 | 17 | 11 | 23 | 430 | 27 | 560 | 9 |
| Thickness of Strip, | | | | | | | | | | | | | |
| mils | 58 | 57 | 58 | 57 | 57 | 58 | 57 | 57 | 59 | 58 | 58 | 59 | 55 |
| mm | 1.47 | 1.45 | 1.47 | 1.45 | 1.45 | 1.47 | 1.45 | 1.45 | 1.50 | 1.47 | 1.47 | 1.50 | 1.40 |
| Stiffness of strip, g | 40 | 35 | 45 | 40 | 55 | 45 | 60 | 50 | 85 | 55 | 95 | 80 | 60 |

Footnotes for Table 4
[1]EVA #8 = "Elvax" 230 resin, E. I. du Pont de Nemours and Company, Inc., 28% VAc; 72% E; M.I. 110
[2]EVA #9 = "Elvax" 250 resin, E. I. du Pont de Nemours and Company, Inc., 28% VAc; 72% E; M.I. 25
[3]EVA #10 = "Elvax" 260 resin, E.I. du Pont de Nemours and Company, Inc. 28% VAc; 72% E; M.I. 6
[4]EVA #11 = "Elvax" 420 resin, E. I. du Pont de Nemours and Company, Inc., 18% VAc; 82% E; M.I. 150
[5]EVA #12 = "Elvax" 460 resin, E. I. du Pont de Nemours and Company, Inc. 18% VAc; 82% E; M.I. 2.5

EXAMPLES 23 TO 29 AND COMPARATIVE EXAMPLES 8 TO 13

The composition and physical properties of the blends are summarized in Table 4. This Table shows the effect of molecular weight (at constant vinyl acetate levels) on the blends of the present invention. Data are provided in pairs.

At high melt index levels (C-8 vs. Ex. 23; C-11 vs. Ex. 26), the principal beneficial change is a modest reduction in the stiffness of the strip. The first major improvement in elongation noted in this series was at a melt

EXAMPLES 30 TO 38 AND COMPARATIVE EXAMPLES 14 TO 16

The composition and physical properties of the blends are summarized in Table 5. The preceding Examples dealt with the effect of the inclusion of fatty acid in three-component systems that contain an EVA resin or mixture of EVA resins, an inert filler, and a process oil. The present Examples illustrate the effect of fatty acid in binary blends of EVA and filler (i.e., the blends do not contain plasticizer or process oil).

cial purposes, the fatty acid concentration might well be increased to the 4–5% level.

TABLE 5

EFFECT OF FATTY ACIDS IN BINARY BLENDS OF EVA AND FILLER

| EXAMPLE NO | C14 | 30 | C15 | 31 | C16(1) | 32 | 33 | 34 | 35 | 36 | 37 | 38 |
|---|---|---|---|---|---|---|---|---|---|---|---|---|
| EVA #1 | 50 | 50 | 30 | 30 | 25 | 25 | 25 | 26.5 | 25.5 | 26.5 | 25.5 | 27.0 |
| No. 9 Whiting | 50 | 50 | 70 | 70 | 75 | 75 | 75 | 72.5 | 72.5 | 72.5 | 72.5 | 72.5 |
| F.A. #3 | 0 | 0.25 | 0 | 0.25 | 0 | 0.25 | 0.50 | 1.0 | 2.0 | — | — | — |
| F.A. #11 | — | — | — | — | — | — | — | — | — | 1.0 | 2.0 | 0.5 |
| Physical Properties | | | | | | | | | | | | |
| M.I. | 1.1 | 1.3 | 0.44 | 0.45 | — | 0.26 | 0.48 | 1.8 | — | 1.3 | — | — |
| SP. GR. | 1.4 | 1.4 | 1.8 | 1.8 | 1.9 | 1.9 | 1.9 | — | — | — | — | 1.84 |
| Tensile Strength | | | | | | | | | | | | |
| PSI | 1650 | 1500 | 710 | 840 | 1140 | 680 | 650 | 400 | 490 | 510 | 410 | 360 |
| kPa | 11400 | 10400 | 4900 | 5800 | 7870 | 4700 | 4490 | 2760 | 3380 | 3420 | 2830 | 2480 |
| Elongation, % | 640 | 665 | 38 | 550 | 21 | 480 | 515 | 110 | 250 | 330 | 320 | 40 |
| Thickness of Strip, | | | | | | | | | | | | |
| mils | 58 | 58 | 58 | 58 | 59 | 59 | 60 | 59 | 59 | 59 | 59 | 59 |
| mm | 1.47 | 1.47 | 1.47 | 1.47 | 1.50 | 1.50 | 1.52 | 1.47 | 1.47 | 1.47 | 1.47 | 1.47 |
| Stiffness of strip, g | 49 | 52 | 145 | 90 | 150 | 135 | 80 | 140 | 150 | 108 | 104 | 125 |

Footnote for Table 5
(1)This product fails an ambient temperature Zero-T Bend. All others pass. Low-temperature flex properties are also very poor for this sample.

At a 50% filler level (C-14 vs. Ex. 30), the beginnings of a significant change are evidenced. The tensile strength of the system has fallen by about 10%, while the elongation has risen slightly. When the blend contains 70% filler (C-15 vs. Ex. 31), the change in elongation is very large—over fourteenfold. At a 75% filler load (C-16 vs. Exs. 32 & 33), the improvement in elongation is over twentyfold. Also, the product of Comparative Example 16 is very brittle and will not pass a 180° bend test—while all others will pass it.

As might be expected, highly filled, plasticizer-free EVA blends are hard to mix, and reproducible results are not always attainable. This is shown by the blends of Examples 32–38 inclusive. These were made at different times, with different filler lots. As will be shown later (Table 11), the fineness of the filler is also a significant variable—which must assume even greater importance in unplasticized systems, when wet-out of the filler is harder to attain. The trend of the results, however, is clear—where the properties might be questionable the amount of fatty acid should be increased. This is confirmed by the blends of Examples 36–38 inclusive, where better results were attained at 1% and 2% levels of fatty acid #11 than were attained at 0.5%. For spe-

EXAMPLES 39 TO 48 AND COMPARATIVE EXAMPLES 17 TO 25

The composition and physical properties of the blends are summarized in Table 6. The very high levels of elongation attainable through the use of fatty acid inclusion in ethylene-based copolymer blends permits the use of very high filler levels. Table 6 illustrates results of increasingly higher filler loads for both whiting and barytes as fillers, in comparative pairs. At the 20% filler level, properties of the blends are little different from those of unmodified resin and fatty acid addition does not noticeably alter blend properties. However, at a 40% filler level (C-18 vs. Ex. 40), improvement in elongation is definitely present; and by 60% filler (C-19 vs. Ex. 41), the improvement is even more pronounced. As the filler level is increased to 80% CaCO3, the elongation enhancement (C-21 vs. Ex. 43) now becomes over fortyfold, with a significant drop in stiffness as well. When the filler is switched to barytes, similar overall effects are encountered—but now, with a dense filler, it is possible to prepare serviceable blends with as high as 90% filler loading (C-25 vs. Exs. 47 and 48) The inclusion of higher amounts of fatty acid might well permit the use of even higher loadings of filler.

TABLE 6

EFFECT OF FATTY ACID ON EVA - PROCESS OIL - FILLER BLENDS AS FILLER LOADING IS INCREASED

| EXAMPLE NO | C17 | 39 | C18 | 40 | C19 | 41 | C20 | 42 | C21 | 43 |
|---|---|---|---|---|---|---|---|---|---|---|
| EVA #1 | 60 | 60 | 45 | 45 | 30 | 30 | 22.5 | 22.5 | 15 | 15 |
| "CIRCOSOL" 4240 | 20 | 20 | 15 | 15 | 10 | 10 | 7.5 | 7.5 | 5 | 5 |
| No. 9 Whiting | 20 | 20 | 40 | 40 | 60 | 60 | 70 | 70 | 80 | 80 |
| No. 22 Barytes | — | — | — | — | — | — | — | — | — | — |
| F.A. #3 | 0 | 0.25 | 0 | 0.25 | 0 | 0.25 | 0 | 0.25 | 0 | 0.5 |
| Physical Properties | | | | | | | | | | |
| MI | — | — | — | — | — | — | — | — | — | 1.4 |
| SP. GR. | 1.07 | 1.08 | 1.25 | 1.27 | 1.6 | 1.6 | 1.79 | 1.77 | 2.0 | 2.0 |
| Tensile Strength | | | | | | | | | | |
| PSI | 1900 | 1690 | 1250 | 1275 | 720 | 720 | 460 | 480 | 780 | 300 |
| kPa | 13100 | 11700 | 8620 | 8790 | 4970 | 4970 | 3170 | 3310 | 5380 | 2070 |
| Elongation, % | 1065 | 1045 | 910 | 950 | 680 | 785 | 340 | 690 | 14 | 600 |
| Thickness of Strip, | | | | | | | | | | |
| mils | 58 | 58 | 57 | 58 | 67 | 67 | 59 | 61 | 53 | 52 |
| mm | 1.47 | 1.47 | 1.45 | 1.47 | 1.70 | 1.70 | 1.50 | 1.55 | 1.35 | 1.32 |
| Stiffness of strip, g | 12 | 13 | 18 | 18 | 41 | 37 | 45 | 39 | 69 | 38 |
| EXAMPLE NO | C22 | 44 | C23 | 45 | C24 | 46 | C25 | 47 | 48 | |
| EVA #1 | 22.5 | 22.5 | 15 | 15 | 11 | 11 | 7 | 7 | 6.5 | |

TABLE 6-continued

EFFECT OF FATTY ACID ON EVA - PROCESS OIL - FILLER BLENDS AS FILLER LOADING IS INCREASED

| | | | | | | | | | |
|---|---|---|---|---|---|---|---|---|---|
| "CIRCOSOL" 4240 | 7.5 | 7.5 | 5 | 5 | 4 | 4 | 3 | 3 | 5.5 |
| No. 9 Whiting | — | — | — | — | — | — | — | — | — |
| No. 22 Barytes | 70 | 70 | 80 | 80 | 85 | 85 | 90 | 90 | 88 |
| F.A. #3 | 0 | 0.25 | 0 | 0.5 | 0 | 0.5 | 0 | 0.5 | 0.25 |
| Physical Properties | | | | | | | | | |
| MI | 10.3 | 10.9 | 5.0 | 7.3 | no flow | 3.1 | — | no flow | — |
| SP. GR. | 2.1 | 2.1 | 2.5 | 2.5 | 2.8 | 2.8 | 3.2 | 3.2 | 3.1 |
| Tensile Strength | | | | | | | | | |
| PSI | 740 | 690 | 470 | 470 | 355 | 355 | 430 | 180 | 130 |
| kPa | 5110 | 4760 | 3240 | 3240 | 2450 | 2310 | 2970 | 1240 | 900 |
| Elongation, % | 810 | 800 | 600 | 670 | 490 | 590 | 5 | 30 | 560 |
| Thickness of Strip, | | | | | | | | | |
| mils | 50 | 49 | 45 | 45 | 39 | 39 | 36 | 36 | 37 |
| mm | 1.27 | 1.25 | 1.14 | 0.14 | 0.99 | 0.99 | 0.91 | 0.91 | 0.94 |
| Stiffness of strip, g | 23 | 21 | 30 | 22 | 26 | 21 | 37 | 24 | 16 |

EXAMPLES 49 TO 55

The composition and physical properties of the blends are summarized in Table 7. These results illustrate that derivatives of fatty acids are also effective; further, that slip agents, in combination with fatty acids, can also provide a definite benefit.

The effectiveness of zinc stearate is shown, in contrast to Comparative Example 1, by Examples 49 and 50. Example 50, with 0.20% zinc stearate added to the basic composition of C-1 (see Table 1), produces elongation values which are virtually identical to those of C-1. Further, the stiffness value, allowing for thickness differences of the samples, is also virtually unchanged. However, by increasing the amount of zinc stearate to 0.25% (Example 49), the elongation shoots up unexpectedly to the 470% level, exactly in the way noted for the unmodified fatty acids. It is interesting to note, and perahps significant for some uses, that the stiffness of the strip for Example 49 is virtually the same as that for Comparative Example 1, whereas when employing fatty acids, at effective levels, significant stiffness reduction was noted.

In comparison to the above result, Example 51 shows that calcium stearate, at 0.25%, was less effective than was zinc stearate. While tests were not performed, it is probable that a still higher level, perhaps 0.4 to 0.5%, will produce blends at the 500% elongation level.

A further series of tests was performed to examine the possible effectiveness of a fatty acid amide, "Armid" O, oleamide, as an elongation enhancer. Once again, the comparison was made with Comparative Example 1. Example 55 shows that this oleamide as the sole additive is not effective at a level of 0.25%. Additional tests were made to explore whether, in combination with a fatty acid, an improved result can be obtained. To magnify the effect, the relatively less-active fatty acid #9 was chosen as the base point.

Thus it can be seen that:

Oleamide alone, at 0.25% (Example 55), does not enhance elongation. It does, however, produce a very smooth, slippery, but not oily finish which should prove useful for specialty items. Higher concentrations of oleamide or of other fatty acid amides, might enhance blend properties, including but not limited to elongation.

Fatty acid #9 alone, at 0.175% inclusion (Example 52), produces about 355% elongation—vs. only 25% for Comparative Example 1 which does not contain fatty acid.

The combination of the oleamide with Fatty Acid #9 produces an elongation value of over 500% (Examples 53 and 54)—even when the oleamide is added at only 0.10%. Thus, use of fatty acid amides in conjunction with fatty acids will enhance elongation, in addition to providing slip properties.

TABLE 7

EFFECT OF FATTY ACID DERIVATIVES ON BLENDS OF EVA - PROCESS OIL - FILLER

| EXAMPLE NO | 49 | 50 | 51 | 52 | 53 | 54 | 55 |
|---|---|---|---|---|---|---|---|
| EVA #1 | 16.2 | 16.2 | 16.2 | 16.2 | 16.2 | 16.2 | 16.2 |
| EVA #2 | 4.0 | 4.0 | 4.0 | 4.0 | 4.0 | 4.0 | 4.0 |
| "CIRCOSOL" 4240 | 7.3 | 7.3 | 7.3 | 7.3 | 7.3 | 7.3 | 7.3 |
| No. 9 Whiting | 72.5 | 72.5 | 72.5 | 72.5 | 72.5 | 72.5 | 72.5 |
| Zinc Stearate | 0.25 | 0.20 | — | — | — | — | — |
| Calcium Stearate | — | — | 0.25 | — | — | — | — |
| F.A. #9 | — | — | — | 0.175 | 0.175 | 0.175 | 0 |
| "Armid" O[1] | — | — | — | 0 | 0.25 | 0.10 | 0.25 |
| Physical Properties | | | | | | | |
| M.I. | 4.2 | — | — | 4.2 | 4.3 | 4.3 | 2.8 |
| SP. GR. | 1.84 | — | — | 1.83 | 1.82 | 1.82 | 1.82 |
| Tensile Strength | | | | | | | |
| PSI | 380 | 530 | 520 | 320 | 350 | 320 | 645 |
| kPa | 2600 | 3660 | 3590 | 2210 | 2420 | 2210 | 4450 |
| Elongation, % | 466 | 23 | 44 | 355 | 550 | 510 | 24 |
| Thickness of Strip, | | | | | | | |
| mils | 60 | 58 | 58 | 59 | 57 | 57 | 57 |
| mm | 1.52 | 1.47 | 1.47 | 1.50 | 1.45 | 1.45 | 1.45 |
| Stiffness of strip, g | 66 | 67 | 70 | 57 | 45 | 45 | 60 |

Footnote for Table 7
[1]"Armid" O, oleamide, derived from the corresponding fatty acid, is slip agent, available from the Armak Division of Akzona, Inc.

EXAMPLES 56 TO 67 AND COMPARATIVE EXAMPLES 26 TO 37

The composition and physical properties of the blends are summarized in Tables 8 and 9. The benefits of addition of fatty acids to ethylene-based copolymers (e.g. EVA) extend also to a wide variety of other copolymers—including the so-called "polyethylenes," which at times may contain small amounts of other olefinic materials as a comonomer. For example, in Table 8, the formulations of Comparative Example 26 and Example 56 show the results of the addition of Fatty Acid #3 at 0.25% in a blend where high-density polyethylene (HDPE) is the sole polymeric material; the remaining ingredients are filler and process oil. A major increase in elongation occurs, as does a reduction in stiffness and an increase in melt index. The next two pairs of Examples (C-27 and Ex. 57; C-28 and Ex. 58) show that this effect continues when EVA resins are also present, at 75% and 50%, respectively, of the total polymer fraction.

The effects noted apply in essentially the same way when the previously described HDPE is replaced with a linear low-density polyethylene (LLDPE). Again, small amounts of a fatty acid, at widely varying LLDPE content, produce very substantial increases in elongation, plus reduction in stiffness level.

In addition to the good results attained with E/VA resins, parallel tests, summarized in Table 9 show that the same beneficial effects occur when E/EA, E/IBA, E/MMA, and E/VA/MAA resins are substituted for E/VA resins. In all cases, the addition of only 0.25% of Fatty Acid #3 enhanced elongation values for test strips by from 3.5 to 16-fold. Also, for all cases, strip stiffness was lowered appreciably.

Tests employing an ethylene/methyl acrylate copolymer at different filler levels showed that blend properties are particularly and beneficially affected by inclusion of a fatty acid. Comparisons were made at two different filler levels-72.5% (Comparative Example 36 vs. Example 66) and 76% (Comparative Example 37 vs. Example 67). The enhancement in elongation values was spectacular—nearly 25-fold for the first sample pair, and fully 20-fold for the second sample pair. In both cases, the stiffness level was appreciably reduced, and the melt index values increased significantly.

In using fatty acids, other effects were also observed. For example, in the E/VA comparative cases noted earlier, we did note one other set of surprising events. In both cases, the test strips, with no additive, would not pass a zero-thickness (180° pinch) crease test. With the fatty acid included, the test was passed with no difficulty. However, at low temperatures (−20° F.), the behavior pattern was reversed; that is, with no fatty acid included, when 1"×6" test strips were bent such that the head and toe of the strips touched, the strips did not snap, even at −20° F. However, with the fatty acid included, the strips no longer will pass the same bend test at −20° F. (In such cases, where low temperatures cause brittleness, successively higher testing temperatures should often be explored. Our experience with ethylene copolymer blends shows that most samples will pass a bend test at −15° or −10° F., when the strips fail at the particularly severe −20° F. test condition.)

The above findings point out once again that when using fatty acids it is necessary for the compounder to test new blends with great care. In most cases, the fatty acids will enhance elongation and soften blends—but other properties must not be taken for granted. All key requirements must be rechecked, as in some cases obtaining the desired improvements may cause a trade-off in the form of an unwanted change in some other property.

TABLE 8

EFFECT OF INCLUSION OF OTHER RESIN TYPES IN BLENDS OF EVA - PROCESS OIL - FILLER AND FATTY ACID

| EXAMPLE NO | C26 | 56 | C27 | 57 | C28 | 58 | C29 | 59 | C30 | 60 | C31 | 61 |
|---|---|---|---|---|---|---|---|---|---|---|---|---|
| EVA #1 | — | — | 12.2 | 12.2 | 8.1 | 8.1 | — | — | 12.2 | 12.2 | 8.1 | 8.1 |
| EVA #2 | — | — | 3.0 | 3.0 | 2.0 | 2.0 | — | — | 3.0 | 3.0 | 2.0 | 2.0 |
| Polymer #1[1] | 20.2 | 20.2 | 5.0 | 5.0 | 10.1 | 10.1 | — | — | — | — | — | — |
| Polymer #2[2] | — | — | — | — | — | — | 20.2 | 20.2 | 5.0 | 5.0 | 10.0 | 10.1 |
| "CIRCOSOL" 4240 | 7.3 | 7.3 | 7.3 | 7.3 | 7.3 | 7.3 | 7.3 | 7.3 | 7.3 | 7.3 | 7.3 | 7.3 |
| No. 9 Whiting | 72.5 | 72.5 | 72.5 | 72.5 | 72.5 | 72.5 | 72.5 | 72.5 | 72.5 | 72.5 | 72.5 | 72.5 |
| F.A. #3 | — | 0.25 | — | 0.25 | — | 0.25 | — | 0.25 | — | 0.25 | — | 0.25 |
| Physical Properties | | | | | | | | | | | | |
| MI | 1.8 | 3.2 | 2.8 | 3.9 | 2.2 | 3.1 | 0.9 | 1.4 | 1.8 | 1.4 | 1.1 | 1.05 |
| SP. GR. | 1.78 | 1.79 | 1.86 | 1.82 | 1.83 | 1.83 | 1.84 | 1.80 | 1.83 | 1.82 | 1.82 | 1.82 |
| Tensile Strength | | | | | | | | | | | | |
| PSI | 480 | 620 | 635 | 365 | 1150 | 420 | 460 | 450 | 460 | 410 | 570 | 410 |
| kPa | 3310 | 4280 | 4380 | 2520 | 7660 | 2900 | 3170 | 3100 | 3170 | 2830 | 3930 | 2830 |
| Elongation, % | <10 | 80 | 17 | 440 | 11 | 280 | 43 | 450 | 23 | 590 | 17 | 530 |
| Thickness of Strip, | | | | | | | | | | | | |
| mils | 58 | 58 | 57 | 58 | 59 | 59 | 59 | 60 | 59 | 59 | 60 | 60 |
| mm | 1.47 | 1.47 | 1.45 | 1.47 | 1.50 | 1.50 | 1.50 | 1.52 | 1.50 | 1.50 | 1.52 | 1.52 |
| Stiffness of strip, | | | | | | | | | | | | |
| g | 390 (broke) | 250 | 240 | 75 | 153 | 110 | 195 | 110 | 84 | 60 | 101 | 81 |

Footnote for Table 8
[1]Polymer #1 = "Alathon" 7835 - High Density (0.96) Polyethylene; M.I. = 3.0; E. I. du Pont de Nemours and Company.
[2]Polymer #2 = "Dowlex" 2045 - Linear Low Density (0.913) Polyethylene. Ethylene/α-olefin Copolymer (About 15% Octene Comonomer); M.I. = 1.14; Dow Chemical Company.

TABLE 9

EFFECT OF FATTY ACIDS ON PROPERTIES OF BLENDS CONTAINING PROCESS OIL, FILLER, PLUS AN E/VA/MAA TERPOLYMER OR A NON-EVA ETHYLENE-BASED COPOLYMER

| EXAMPLE NO | C32 | 62 | C33 | 63 | C34 | 64 |
|---|---|---|---|---|---|---|
| E/EA Resin #1[1] | 20.2 | 20.2 | — | — | — | — |
| E/IBA RESIN #1[2] | — | — | 20.2 | 20.2 | — | — |
| E/MMA Resin #1[3] | — | — | — | — | 20.2 | 20.2 |
| E/VA/MAA Resin #1[4] | — | — | — | — | — | — |
| E/MA Resin #1[5] | — | — | — | — | — | — |
| "CIRCOSOL" 4240 | 7.3 | 7.3 | 7.3 | 7.3 | 7.3 | 7.3 |
| No. 9 Whiting | 72.5 | 72.5 | 72.5 | 72.5 | 72.5 | 72.5 |
| F.A. #3 | — | 0.25 | — | 0.25 | — | 0.25 |
| Physical Properties | | | | | | |
| M.I. | — | 4.47 | — | — | — | — |
| SP. GR. | 1.76 | 1.82 | 1.81 | 1.81 | 1.81 | 1.84 |
| Tensile Strength | | | | | | |
| PSI | 550 | 240 | 540 | 190 | 580 | 215 |
| kPa | 3800 | 1660 | 3730 | 1310 | 4000 | 1480 |
| Elongation, % | 15 | 260 | 23 | 175 | 22 | 224 |
| Thickness of Strip, | | | | | | |
| mils | 61 | 59 | 59 | 58 | 59 | 58 |
| mm | 1.55 | 1.50 | 1.50 | 1.47 | 1.50 | 1.47 |
| Stiffness of strip, | | | | | | |
| g | 94 | 52 | 73 | 46 | 71 | 50 |
| EXAMPLE NO | C35 | 65 | C36 | 66 | C37 | 67 |
| E/EA Resin #1[1] | — | — | — | — | — | — |
| E/IBA RESIN #1[2] | — | — | — | — | — | — |
| E/MMA Resin #1[3] | — | — | — | — | — | — |

TABLE 9-continued
EFFECT OF FATTY ACIDS ON PROPERTIES OF BLENDS CONTAINING PROCESS OIL, FILLER, PLUS AN E/VA/MAA TERPOLYMER OR A NON-EVA ETHYLENE-BASED COPOLYMER

| | | | | | | |
|---|---|---|---|---|---|---|
| E/VA/MAA Resin #1[4] | 21.0 | 21.0 | — | — | — | — |
| E/MA Resin #1[5] | — | — | 20.2 | 20.2 | 17.6 | 17.6 |
| "CIRCOSOL" 4240 | 9.0 | 9.0 | 7.3 | 7.3 | 6.4 | 6.4 |
| No. 9 Whiting | 70.0 | 70.0 | 72.5 | 72.5 | 76.0 | 76.0 |
| F.A. #3 | — | 0.25 | — | 0.25 | — | 0.50 |
| Physical Properties | | | | | | |
| M.I. | — | 14.5 | 4.5 | 5.7 | 3.3 | 6.4 |
| SP. GR. | 1.74 | 1.77 | 1.84 | 1.81 | 1.85 | 1.86 |
| Tensile Strength | | | | | | |
| PSI | 550 | 260 | 658 | 237 | 682 | 203 |
| kPa | 3790 | 1790 | 4540 | 1630 | 4700 | 1400 |
| Elongation, % | 63 | 217 | 12 | 297 | 12 | 240 |
| Thickness of Strip | | | | | | |
| mils | 62 | 63 | 60 | 60 | 58 | 59 |
| mm | 1.57 | 1.60 | 1.52 | 1.52 | 1.47 | 1.50 |
| Stiffness of strip | | | | | | |
| g | 56 | 44 | 84 | 43 | 93 | 45 |

Footnote for Table 9
[1]E/EA Resin #1 = Ethylene/ethyl acrylate copolymer, Grade DPDA 6182 NT; contains about 15% EA; 85% E, M.I. = about 1.5; ex Union Carbide Corporation.
[2]E/IBA Resin #1 = Ethylene/isobutyl acrylate copolymer; 20% IBA and 80% E; 2.5 M.I.
[3]E/MMA Resin #1 = Ethylene/methyl methacrylate copolymer; 18% MMA; 82% E; 2.2 M.I.
[4]E/VA/MAA Resin #1 = Ethylene/vinyl acetate/methacrylic acid terpolymer; 74% E; 25% VAc; 1% MAA; 6.0 M.I.
[5]E/MA Resin #1 = Ethylene/methyl acrylate copolymer; 20% MA; 80% E; 2 M.I.

EXAMPLES 68 TO 73

The composition and physical properties of the blends are summarized in Table 10. Most oils classed as naphthenic and aromatic process oils will produce highly filled EVA blends that are nonbleeding or "dry" to the touch. Conversely, otherwise identical blends made with most paraffinic process oils will "bleed," and thus are useful only in specialty applications.

Table 10 shows the results of including either Fatty Acid #3 or 12 in typical highly filled EVA blends made with the three different process oil types. The blends of Comparative Example 1 and Example 3 were made using a readily available naphthenic process oil, "Circosol" 4240. These compositions do not bleed. If a different naphthenic oil, "Tufflo" 2000P, or an aromatic oil, "Sundex" 790, is substituted for "Circosol" 4240, the overall results are very similar to those attained for Example 3 (see Examples 68, 69, and 71, 72); that is, in comparison to the C-1 blend, the elongation values are excellent; melt index values are higher; the stiffness of the blend is appreciably lower; and the sacrifice in tensile strength is modest. Most of these statements also apply to the blends which were made with a paraffinic process oil (Ex. 70 and 73). The principal differences are that the blends are now far softer than the C-1 blend, and the blends "bleed" heavily.

In compounding highly filled EVA blends which contain process oils and additives, it is clear the compounder must take great care to be certain the final product will prove suitable for its intended use. Interactions can well occur which might lead to unanticipated side effects. For example, we have made some blends which showed no tendency to "bloom" when the additive level was low—e.g., 0.25 to 0.5%. In a few instances, as levels of additives were increased, these "nonblooming" blends would begin to "bloom."

TABLE 10
EFFECT OF VARIOUS TYPES OF PROCESS OIL IN BLENDS OF EVA - PROCESS OIL - FILLER AND FATTY ACID

| EXAMPLE NO. | C1 | 3 | 68 | 69 | 70 | 71 | 72 | 73 |
|---|---|---|---|---|---|---|---|---|
| EVA #1 | 16.2 | 16.2 | 16.2 | 16.2 | 16.2 | 16.2 | 16.2 | 16.2 |
| EVA #2 | 4.0 | 4.0 | 4.0 | 4.0 | 4.0 | 4.0 | 4.0 | 4.0 |
| Filler - No. 9 Whiting | 72.5 | 72.5 | 72.5 | 72.5 | 72.5 | 72.5 | 72.5 | 72.5 |
| Fatty Acid #3 | — | 0.25 | 0.25 | 0.25 | 0.25 | — | — | — |
| Fatty Acid #12[1] | — | — | — | — | — | 0.25 | 0.25 | 0.25 |
| Process Oil: | | | | | | | | |
| "Circosol" 4240[2] | 7.3 | 7.3 | — | — | — | — | — | — |
| "Tufflo" 2000 P[2] | — | — | 7.3 | — | — | 7.3 | — | — |
| "Sundex" 790[2] | — | — | — | 7.3 | — | — | 7.3 | — |
| "Sunpar" 2280[2] [3] | — | — | — | — | 7.3 | — | — | 7.3 |
| Physical Properties | | | | | | | | |
| M.I. | 2.2 | 4.3 | 4.1 | 3.8 | 4.7 | 4.1 | 3.0 | 4.7 |
| SP. GR. | 1.82 | 1.83 | 1.83 | 1.82 | 1.86 | 1.85 | 1.90 | 1.85 |
| Tensile Strength | | | | | | | | |
| PSI | 650 | 360 | 420 | 491 | 378 | 408 | 491 | 398 |
| kPa | 4480 | 2480 | 2890 | 3380 | 2610 | 2810 | 3380 | 2740 |
| Elongation, % | 25 | 540 | 609 | 546 | 525 | 621 | 548 | 584 |
| Thickness of Strip | | | | | | | | |
| mils | 62 | 59 | 59 | 60 | 58 | 59 | 57 | 57 |
| mm | 1.57 | 1.50 | 1.50 | 1.52 | 1.47 | 1.50 | 1.45 | 1.45 |
| Stiffness of Strip, g. | 75 | 49 | 46 | 64 | 32 | 43 | 57 | 29 |

Footnotes for Table 10
[1]Fatty Acid #12 - "Industrene" M, Humko Sheffield Division of Kraft, Inc., Liquid Dimer Acid; intermediate cut; mixed stream.
[2]The description and physical properties of these process oils are:

| | Type[1] | ASTM Type | Sp. Gr. | Viscosity[2] SUS-100° F. |
|---|---|---|---|---|
| "Circosol" 4240 | N | 103 | 0.95 | 2525 |
| "Tufflo" 2000P | N | — | 0.95 | 2150 |
| "Sundex" 790 | A | 102 | 0.98 | 3500 |
| "Sunpar" 2280 | P | 104B | 0.89 | 2907 |

| | Carbon Atoms, % | | | |
|---|---|---|---|---|
| | $C_A$ | $C_N$ | $C_P$ | Mfg[3] |
| "Circosol" 4240 | 21 | 39 | 40 | Sun |

TABLE 10-continued
EFFECT OF VARIOUS TYPES OF PROCESS OIL IN BLENDS OF EVA - PROCESS OIL - FILLER AND FATTY ACID

| | | | | |
|---|---|---|---|---|
| "Tufflo" 2000P | 20 | 39 | 41 | Arco |
| "Sundex" 790 | 37 | 28 | 35 | Sun |
| "Sunpar" 2280 | 4 | 25 | 71 | Sun | wherein:
[A]N = Naphthenic oil
A = Aromatic oil
P = Paraffinic oil
[B]SUS = Saybolt Universal Seconds
[C]Sun = Sun Oil Company
Arco = Atlantic Richfield Co.
[3]The two blends made with this paraffinic oil "bleed" heavily.

EXAMPLES 74 TO 82

The composition and physical properties of the blends are summarized in Table 11. This table shows that the particle size of the filler can be an important variable when utilizing fatty acids to enhance the physical properties of highly filled ethylene copolymer blends. The blend of Comparative Example #1 (see Table 1) is used as the basis for comparison; all other blends in Table 11 use the same type and amount of EVA and process oil. All use Fatty Acid #12 in the indicated amounts. The major change made in Examples 74 through 82 is to change the filler type and, where necessary, the amount of fatty acid employed.

Example 74 shows the benefits attained when only 0.25% of Fatty Acid #12 is added to the composition of Comparative Example 1. The benefits which accrue are similar to those noted above when other fatty acids were evaluated, as the elongation has increased from 25% to 580%.

In Examples 75 and 77 the experiment of Example 74 was followed to show what happens as finer fillers are substituted. Filler 85/200 contains many fine and coarse particles; results are not quite so good as for Example 74. The particle size of the "Atomite" filler used in compounding Example 77 is very fine; the use of 0.25% of Fatty Acid #12 proved to be ineffective. In Examples 79 and 80, the amount of fatty acid was increased to 1% and 3%, respectively, based on the weight of the other ingredients. In both cases, the elongation value rose dramatically to the 600% level. At 1% inclusion, the melt index value rose to over 6 and, at 3%, to over 16. Also, the stiffness values continued to fall, eventually reaching only 23 g. at the 3% level.

In Examples 78, 81, and 82 alumina trihydrate, another very fine filler was used. These examples exhibited the same pattern as was noted in Examples 77, 79, and 80. In other words it was found again that a fine filler requires a higher fatty acid level than does a medium-ground filler, such as No. 9 Whiting.

Fineness of filler is not the sole criterion. In Example 76, No. 22 barytes, a fine filler, was tested in an otherwise same resin blend. The elongation, tensile, and stiffness values responded the same way as for alumina trihydrate and for "Atomite", despite having an approximately equivalent fineness of grind. However, barytes is a very dense filler—4.4—vs. the other types, which fall in the 2.2 to 2.7 range. The final barytes blend, therefore, has a lower volumetric solids level (38%) than does the whiting-based blend (49% by volume), with both at equal weight percent filler load.

Thus, when selecting a fatty acid level, the filler level, the fineness of the filler, and the filler density have to be considered in order to develop an optimized blend.

TABLE 11
EFFECT OF VARYING THE TYPE OF FILLER IN BLENDS OF EVA - PROCESS OIL - FILLER AND FATTY ACID

| EXAMPLE NO. | 74 | 75 | 76 | 77 | 78 |
|---|---|---|---|---|---|
| EVA #1 | 16.2 | 16.2 | 16.2 | 16.2 | 16.2 |
| EVA #2 | 4.0 | 4.0 | 4.0 | 4.0 | 4.0 |
| "Circosol" 4240 | 7.3 | 7.3 | 7.3 | 7.3 | 7.3 |
| Fatty Acid #12 | 0.25 | 0.25 | 0.25 | 0.25 | 0.25 |
| Filler Type: | | | | | |
| No. 9 Whiting | 72.5 | — | — | — | — |
| No. 85/200[1] | — | 72.5 | — | — | — |
| "Atomite"[2] | — | — | — | 72.5 | — |
| Hydrated Alumina[3] | — | — | — | — | 72.5 |
| No. 22 Barytes[4] | — | — | 72.5 | — | — |
| Physical Properties | | | | | |
| M.I. | — | 4.4 | 9.4 | 1.8 | 1.4 |
| SP. GR. | 1.85 | 1.84 | 2.19 | 1.84 | 1.75 |
| Tensile Strength | | | | | |
| PSI | 410 | 380 | 520 | 700 | 640 |
| kPa | 2830 | 2620 | 3590 | 4830 | 4410 |
| Elongation, % | 580 | 510 | 640 | 20 | 20 |
| Thickness of Strip | | | | | |
| mils | 60 | 58 | 55 | 59 | 62 |
| mm | 1.52 | 1.47 | 1.39 | 1.50 | 1.57 |
| Stiffness of Strip, g | 57 | 45 | 25 | 57 | 77 |
| EXAMPLE NO. | 79 | 80 | 81 | 82 | |
| EVA #1 | 16.2 | 16.2 | 1.62 | 16.2 | |
| EVA #2 | 4.0 | 4.0 | 4.0 | 4.0 | |
| "Circosol" 4240 | 7.3 | 7.3 | 7.3 | 7.3 | |
| Fatty Acid #12 | 1.0 | 3.0 | 1.0 | 3.0 | |
| Filler Type: | | | | | |
| No. 9 Whiting | — | — | — | — | |
| No. 85/200[1] | — | — | — | — | |
| "Atomite"[2] | 72.5 | 72.5 | — | — | |
| Hydrated Alumina[3] | — | — | 72.5 | 72.5 | |
| No. 22 Barytes[4] | — | — | — | — | |
| Physical Properties | | | | | |
| M.I. | 6.4 | 16.2 | 2.8 | 6.4 | |
| SP. GR. | 1.80 | 1.77 | 1.72 | 1.74 | |
| Tensile Strength | | | | | |
| PSI | 380 | 310 | 320 | 260 | |
| kPa | 2620 | 2140 | 2210 | 1790 | |
| Elongation, % | 610 | 560 | 590 | 560 | |
| Thickness of Strip | | | | | |
| mils | 60 | 60 | 60 | 60 | |
| mm | 1.52 | 1.52 | 1.52 | 1.52 | |
| Stiffness of Strip, g | 34 | 23 | 34 | 23 | |

Footnotes for Table 11
[1]No. 85/200 Filler - A high calcium limestone filler, 85% finer than 200 mesh, ex Franklin Limestone Company, Nashville, TN.
[2]"Atomite" - finely ground (approximately 2.5 micron average) limestone filler, primarily $CaCO_3$, ex Thompson, Weinman Company, Cartersville, GA. 100% passes 325 mesh.
[3]Hydrated Alumina - Grade KC-100, $Al_2O_3 \cdot 3H_2O$, 98% min. finer than 325 mesh, supplied by A. B. Wood Company, Charlotte, NC.
[4]No. 22 Barytes - A heavy filler which has a density of about 4.4 g/cm$^3$; primarily $BaSO_4$, ex Thompson, Weinman Co. Approx. 99.5% finer than 325 mesh.

EXAMPLES 83 TO 88

The composition and physical properties of the blends are summarized in Table 12. Several organic acids were tested to determine their effect in the blends of the present invention. Some acid types which could in the broad sense be considered as homologs of the fatty acids were found to be effective. Table 12 illustrates two successful types, cyclohexane carboxylic acid, a saturated ring type, and, benzoic acid, an aromatic ring type. Both were found to greatly enhance the elongation of the blend as compared to Comparative Example 1. More complex organic acids of these same types should also prove effective. Both acids are effective at very low (0.25%) concentrations. Example 88, where the alicyclic acid concentration is increased to 0.75%, shows the full 450+% elongation as for lower levels of benzoic acid. In the case of benzoic acid, further increases in concentrations up to 4% did not cause significant improvement vs. the 0.75% level. Indeed, at a benzoic acid level of 4%, "blooming" of acid crystals first became evident, although the physical properties of the blend remained outstanding.

Both of the acids employed in these Examples release a pungent odor at mixing temperatures (circa 350°-375° F.). Thus, their use is expected to be limited.

Various combinations of active and less active acids, resins, polymers, etc. can be considered to obtain special effects, such as the earlier-mentioned enhanced results attained by using oleamide in combination with Fatty Acid #9. (see Table 7, Ex. 53–55) A skilled compounder can no doubt secure special effects, without significant departure from the spirit of this invention. For example, a very common method, widely used in industry for the reduction of blend viscosity (i.e., increase in melt index) in hot melt blends, is the addition of small amounts of paraffin wax to the blend. This can readily be done with most, if not all, of the blends of the present invention. As another example of such approaches, we have tested the use of tackifier resins in blends, as a substituent to enhance the adhesivity of formulations. This was attainable—use of tackifiers plus fatty acid-type additives will provide both enhanced elongation and adhesivity. This is illustrated in the Examples to follow.

TABLE 12
EFFECT OF AROMATIC AND ALICYCLIC ACIDS ON PROPERTIES OF BLENDS CONTAINING EVA - PROCESS OIL AND FILLER

| EXAMPLE NO. | C-1 | 83 | 84 | 85 | 86 | 87 | 88 |
|---|---|---|---|---|---|---|---|
| EVA #1 | 16.2 | 16.2 | 16.2 | 16.2 | 16.2 | 16.2 | 16.2 |
| EVA #2 | 4.0 | 4.0 | 4.0 | 4.0 | 4.0 | 4.0 | 4.0 |
| Process Oil: | | | | | | | |
| "Circosol" 4240 | 7.3 | 7.3 | 7.3 | 7.3 | 7.3 | 7.3 | 7.3 |
| Filler: | | | | | | | |
| No. 9 Whiting | 72.5 | 72.5 | 72.5 | 72.5 | 72.5 | 72.5 | 72.5 |
| Cyclohexane Carboxylic Acid | — | — | — | — | — | 0.25 | 0.75 |
| Benzoic Acid | — | 0.25 | 0.75 | 2.0 | 4.0 | — | — |
| Physical Properties | | | | | | | |
| M.I. | 2.2 | 5.0 | 5.3 | 5.0 | 7.5 | 4.2 | 4.1 |
| Tensile Strength | | | | | | | |
| PSI | 650 | 350 | 400 | 370 | 370 | 290 | 370 |
| kPa | 4480 | 2410 | 2760 | 2550 | 2550 | 2000 | 2550 |
| Elongation, % | 25 | 480 | 520 | 510 | 460 | 230 | 470 |
| Thickness of Strip | | | | | | | |
| mils | 62 | 60 | 59 | 60 | 58 | 60 | 60 |
| mm | 1.57 | 1.52 | 1.50 | 1.52 | 1.47 | 1.52 | 1.52 |
| Stiffness of Strip, g | 75 | 68 | 59 | 66 | 56 | 75 | 58 |

EXAMPLES 89 TO 98 AND COMPARATIVE EXAMPLE 38

Binary compositions of an ethylene-containing thermoplastic resin plus appreciable quantities of a process oil—say, in a 3:1 ratio by weight—will, when warm, be fluid and adhere well to plastics, textile webs, etc. However, when filler is added as a third component, the dry filler will make the filled resin charge progressively less fluid—less tacky—and thus adhere less well to substrates. For blends where filler levels are high—say, 70% and over—poor adhesion to substrates can pose a problem to a manufacturer of composite sound deadening carpeting. We explored the effect of the use of tackifiers on the improved elongation properties that fatty acids impart to the highly filled, oil-containing EVA blends. The data for these experiments are give in Table 13.

Example 89 shows that Fatty Acid #9, at 0.3% concentration in the blend, will produce 390% elongation. With no fatty acid present, but with inclusion of 2% of a tackifier in an almost identical formulation, only 10% elongation is secured, as shown in Comparative Example 38. Example 90 shows the result of adding only 0.3% Fatty Acid #9 to the C-38 composition—the elongation jumps dramatically to nearly 500%. This value is well above the elongation shown in Ex. 89 and along with the other properties obtained it demonstrates that the use of a fatty acid plus a tackifier resin will cause a variety of useful changes:

(1) The elongation is enhanced substantially.
(2) The melt index increases significantly, which opens the way to inclusion of still more filler.
(3) The tensile strength, while reduced, is still easily sufficient for most purposes.
(4) The stiffness of the final compound is sharply reduced.
(5) The tack rating has been improved significantly from the tack-free condition of Ex. 89.

The changes described above will be magnified by further substitution of tackifier resin for EVA resin, as shown by the results of Example 91. The tack rating has been doubled from that of Example 90, the stiffness has been halved, and the melt index has risen sixfold. Thus, the compounder has an additional valuable tool to enable creation of a wide variety of end products.

Examples 92–98, inclusive, show that the effects described above are not limited to the specific combination of EVA #4 and Tackifier #1. A wide variety of EVA resins, tackifier resins and fatty acids can be used in the development of new, useful, inexpensive, highly filled blends with enhanced adhesivity and elongation.

TABLE 13
EFFECT OF TACKIFIER RESINS AND FATTY ACIDS IN BLENDS WHICH CONTAIN EVA RESIN - PROCESS OIL AND FILLER

| EXAMPLE NO. | 89 | C38 | 90 | 91 | 92 | 93 |
|---|---|---|---|---|---|---|
| EVA #4 | 17.3 | 15 | 15 | 10 | 15 | 10 |
| EVA #6 | — | — | — | — | — | — |
| Process Oil: | | | | | | |
| "Circosol" 4240 | 6.4 | 7.0 | 7.0 | 8.0 | 5.0 | 8.0 |
| Filler: | | | | | | |
| No. 9 Whiting | 76.0 | 76.0 | 76.0 | 76.0 | 76.0 | 76.0 |
| Fatty Acid #9 | 0.3 | — | 0.3 | 0.3 | 0.3 | 0.3 |
| Tackifier #1[(1)] | — | 2.0 | 2.0 | 6.0 | — | — |
| Tackifier #2[(2)] | — | — | — | — | 4.0 | 6.0 |
| Tackifier #3[(3)] | — | — | — | — | — | — |
| Tackifier #4[(4)] | — | — | — | — | — | — |
| Tackifier #5[(5)] | — | — | — | — | — | — |

TABLE 13-continued

EFFECT OF TACKIFIER RESINS AND FATTY ACIDS IN BLENDS WHICH CONTAIN EVA RESIN - PROCESS OIL AND FILLER

| Physical Properties | | | | | | |
|---|---|---|---|---|---|---|
| Tack Rating[6] [7] | 0 | 1.5 | 1.5 | 3.2 | 3.3 | 3.6 |
| M.I. | 1.2 | 2.6 | 5.2 | 32 | 5.6 | 29 |
| Tensile Strength | | | | | | |
| PSI | 350 | 760 | 270 | 115 | 300 | 100 |
| kPa | 2410 | 5240 | 1860 | 790 | 2070 | 690 |
| Elongation, % | 390 | 10 | 490 | 470 | 490 | 340 |
| Stiffness of Strip, g | 89 | 93 | 56 | 25 | 60 | 22 |

| EXAMPLE NO. | 94 | 95 | 96 | 97 | 98 |
|---|---|---|---|---|---|
| EVA #4 | — | — | — | — | — |
| EVA #6 | 15 | 10 | 15 | 10 | 10 |
| Process Oil: | | | | | |
| "Circosol" 4240 | 4.0 | 8.0 | 6.0 | 8.0 | 8.0 |
| Filler: | | | | | |
| No. 9 Whiting | 76.0 | 76.0 | 76.0 | 76.0 | 76.0 |
| Fatty Acid #9 | 0.3 | 0.3 | 0.3 | 0.3 | 0.3 |
| Tackifier #1[1] | — | — | — | — | — |
| Tackifier #2[2] | — | — | — | — | — |
| Tackifier #3[3] | 5.0 | 6.0 | — | — | — |
| Tackifier #4[4] | — | — | 3.0 | 6.0 | — |
| Tackifier #5[5] | — | — | — | — | 6.0 |
| Physical Properties | | | | | |
| Tack Rating[6] [7] | 1.7 | 3.8 | 1.3 | 3.4 | 1.6 |
| M.I. | 10.8 | 58 | 6.2 | 61 | 67 |
| Tensile Strength | | | | | |
| PSI | 360 | 110 | 360 | 110 | 160 |
| kPa | 2480 | 760 | 2480 | 760 | 1100 |
| Elongation, % | 660 | 510 | 640 | 550 | 774 |
| Stiffness of Strip, g | 65 | 16 | 60 | 23 | 11 |

Footnotes for Table 13
[1]Tackifier #1 = "Piccovar" L-60 (Hercules, Inc.). Low softening point, aromatic hydrocarbon resin.
[2]Tackifier #2 = "Wingtack" 95 (Goodyear Tire & Rubber Co.). A synthetic polyterpene resin.
[3]Tackifier #3 = "Piccopale" 100 (Hercules, Inc.). Aliphatic low molecular-weight hydrocarbon resin
[4]Tackifier #4 = "Piccotac" A (Hercules, Inc.). High softening point, low molecular-weight aliphatic hydrocarbon resin.
[5]Tackifier #5 = "Foral" 85 (Hercules, Inc.). Hydrogenated rosin, glycerol ester resin.
[6]The tack ratings were average values for several observers, who used a common subjective standard from zero to 4:
0 = Not tacky to touch. Sample plaque will slide easily along a smooth surface.
1 = Perceptible tack to finger. Plaque no longer slides easily.
2 = Moderate tack to finger. Plaque slides with difficulty.
3 = Sticky to touch. Samples will nearly adhere to observer's fingers.
4 = Strongly sticky. Samples will stick in inverted position for 5-10 seconds or longer.
[7]Thickness for all strips was 60 ± 2 mils or approximately 1.5-1.55 mm thick.

EXAMPLES 99-100 AND COMPARATIVE EXAMPLES 39 TO 41

The composition and physical properties of the blends are summarized in Table 14. The effect of a polyester-type plasticizer, in addition to, or in place of, the process oil plasticizer was explored in the present Examples.

Comparative Example 39 shows a simple, highly filled (76% CaCO₃) oil-plasticized EVA blend that does not contain any fatty acid. Its elongation, at only 11%, shows that it would be a poor candidate for uses where extruded sheeting must resist cracking or tearing. Comparative Example 40 shows that inclusion of a small amount (1.2%) of polyester plasticizer will produce a substantial improvement in the elongation value to the 470% level. This discovery is the subject matter of and is more fully described in copending patent application Ser. No. 273,419, filed June 15, 1981, now U.S. Pat. No. 4,403,007, issued Sept. 6, 1983. A further inclusion of a small amount of Fatty Acid #6 (only 0.3%) will produce a further 10% improvement in elongation (Ex. 99) and, in addition, will increase the melt index nearly twofold and reduce the stiffness of the strip by one-third. Thus, combining these ingredients provides a skilled formulator with additional means to attain a desired balance of properties.

Previous work (cf. U.S. Pat. No. 4,222,924) has shown that inclusion of clay is possible in filled plasticized blends of ethylene polymers. The data of Comparative Example 41 and Example 100 once again demonstrate that the addition of only 0.4% of Fatty Acid #3 to the clay containing composition of C-41 will produce a dramatic increase in both the melt index and the elongation values—and a major reduction in the stiffness of the compound. It is also significant to note that the inclusion of a 400 M.I. EVA resin (EVA #13) enables production of compositions such as that of Example 100, having an MI value of 102, which is far above the MI of compositions described heretofore.

TABLE 14

INCLUSION OF SPECIAL INGREDIENTS IN BLENDS OF EVA RESIN - PROCESS OIL - FILLER AND FATTY ACID

| EXAMPLE NO. | C39 | C40 | 99 | C41 | 100 |
|---|---|---|---|---|---|
| EVA #4 | 17.5 | 17.5 | 17.5 | — | — |
| EVA #13[1] | — | — | — | 12.5 | 12.5 |
| EVA #1 | — | — | — | 12.5 | 12.5 |
| Process Oil: | | | | | |
| "Circosol" 4240 | 6.5 | 5.3 | 5.3 | 15 | 15 |
| Plasticizer: | | | | | |
| "Santicizer" 429[2] | 0 | 1.2 | 1.2 | 0 | 0 |
| Filler - No. 9 Whiting | 76.0 | 76.0 | 76.0 | 45 | 45 |
| Filler - "Suprex" clay | — | — | — | 15 | 15 |
| Fatty Acid #6 | 0 | 0 | 0.3 | 0 | 0 |
| Fatty Acid #3 | 0 | 0 | 0 | 0 | 0.4 |
| Physical Properties | | | | | |
| M.I. | 1.8 | 0.8 | 1.4 | 59 | 102 |
| SP. GR. | 1.87 | 1.88 | 1.87 | — | 1.56 |
| Tensile Strength | | | | | |
| PSI | 830 | 350 | 340 | 190 | 240 |
| kPa | 5720 | 2410 | 2340 | 1310 | 1650 |
| Elongation, % | 11 | 470 | 510 | 103 | 570 |
| Stiffness of Strip, g | 104 | 80 | 53 | 33 | 18 |

Footnotes Table 14
[1]EVA No. 13 = "Elvax" 310 resin, E. I. du Pont de Nemours and Company., Inc., 25% VAc; 400 M.I.
[2]"Santicizer" 429 = medium molecular weight polyester type plasticizer from Monsanto; Sp. Gr. 1.1, freezing point < −60° C., acid number 22 mg KOH/g, viscosity @ 25° C. is 50 strokes.

We claim:

1. A thermoplastic composition consisting essentially of
(a) from 0 to about 50% by weight of at least one copolymer of ethylene with at least one comonomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40 to 95% by weight, the comonomer content of said copolymer being from about 5 to about 60% by weight, and the melt index of said copolymer being from 0.1 to about 400, provided that when said copolymer of ethylene is an ethylene/vinyl ester or ethylene/unsaturated mono- or dicarboxylic acid ester copolymer said copolymer can contain up to about 15 percent by weight of carbon monoxide or sulfur dioxide; provided, that when the olefin polymer of paragraph (e) is absent, the amount of ethylene copolymer is at least about 5% by weight;
(b) from 0 to 20 percent by weight of at least one plasticizer selected from the group consisting of processing oils, epoxidized oils, polyesters, polyethers, and polyether esters;
(c) from about 40 to about 90% by weight of filler;
(d) from about 0.05 to about 5% by weight of at least one organic acid or acid derivative selected from the group consisting of saturated mono- and polycarboxylic acids having from 6 to 54 carbon atoms, unsaturated mono- and dicarboxylic acids having from 12 to 20 carbon atoms, alicyclic and aromatic carboxylic acids and mono-, di- and trivalent metal salts, esters and amides of said organic acids, provided that the amount of acid is at least equal to the amount at which concentration a step-wise increase occurs on a plot of tensile elongation at break expressed as a function of acid concentration;
(e) from 0 to about 55% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to 20% by weight provided, that when the ethylene copolymer of paragraph (a) is absent the amount of olefin polymer is at least about 5% by weight; and
(f) from 0 to about 30% by weight of tackifier.

2. The composition of claim 1 wherein said organic acid is selected from the group consisting of saturated mono-, di- and tricarboxylic acids having from 6 to 54 carbon atoms, unsaturated mono- and dicarboxylic acids having from 12 to 20 carbon atoms, and zinc and calcium salts of said acids.

3. The composition of claim 2 wherein said copolymer of ethylene is present in an amount of from about 5 percent to about 50 percent by weight and is a mixture of at least two copolymers of ethylene, copolymer (A) and copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, the salts of said unsaturated acids, and esters of said unsaturated acids wherein the alcohol moiety has 1 to 8 carbon atoms, copolymer (A) having a polar comonomer content of from about 2 to about 30 percent by weight, an ethylene content of from about 70 to about 98 percent by weight and a melt index of from about 0.1 to about 20, and copolymer (B) having a polar comonomer content of from about 28 to about 60 percent by weight, an ethylene content of from about 40 to about 72 percent by weight and a melt index of from about 5 to about 1000, provided that the polar comonomer content of copolymer (B) is at least 12 percent by weight higher than the polar comonomer content of copolymer (A) and the weight ratio of copolymer (A) to copolymer (B) is from about 99/1 to about 55/45.

4. The composition of claim 3, wherein (a) said mixture of at least two copolymers of ethylene is present in an amount of from about 8 to 35 percent by weight, copolymer (A) having a polar comonomer content of from about 5 to about 28 percent by weight, an ethylene content of from about 72 to about 95 percent by weight and a melt index of from about 0.3 to about 10, and copolymer (B) having a polar comonomer content of from about 30 to about 60 percent by weight, an ethylene content of from about 40 to about 70 percent by weight and a melt index of from about 10 to about 200, provided that the polar comonomer content of copolymer (B) is at least 15 percent by weight higher than the polar comonomer content of copolymer (A); (b) said plasticizer is present in an amount of from about 2 to about 15 percent by weight wherein from 0 to about 50% by weight of said plasticizer is a plasticizer other than processing oil; (c) said filler is present in an amount of from about 55 to about 90 percent by weight, (d) said organic acid is present in an amount of from about 0.1 to about 2% by weight; and (e) said tackifier is present in an amount of from 0 to about 20% by weight.

5. The composition of claim 4, wherein the ratio of copolymer (A) to copolymer (B) is from about 97/3 to about 60/40.

6. The composition of claim 2 wherein (a) said copolymer of ethylene is present in an amount of from about 8 to about 35 percent by weight, the ethylene content of said copolymer being from about 45 to about 91% by weight, the comonomer content of said copolymer being from about 9 to about 55 percent by weight and the melt index of said copolymer being from about 0.1 to about 50; (b) said plasticizer is present in an amount of from about 2 to about 15 percent by weight wherein from 0 to about 50% by weight of said plasticizer is a plasticizer other than processing oil; (c) said filler is present in an amount of from about 55 to about 90 percent by weight; (d) said organic acid is present in an amount of from about 0.1 to about 2% by weight; and (f) said tackifier is present in an amount of from 0 to about 20% by weight.

7. The composition of claim 6 wherein said filler is selected from the group consisting of calcium carbonate, barium sulfate, hydrated alumina, clay, magnesium carbonate, calcium sulfate, silica, iron, lead, or oxides thereof, mica, talc and wollastonite, flyash, cement dust, yarns, wood flour, nut shells, ground rice hulls and mixtures thereof.

8. The composition of claim 7 wherein said filler is selected from the group consisting of calcium carbonate, barium sulfate, hydrated alumina, and mixtures thereof.

9. The composition of claim 8 containing up to about 15% by weight of a polymer selected from the group consisting of ethylene/carbon monoxide and ethylene/sulfur dioxide.

10. The composition of claim 8 wherein said organic acid is selected from the group consisting of palmitic, stearic and oleic acids, dimers and trimers thereof, and mixtures of these acids.

11. The composition of claim 10 wherein said copolymer of ethylene is selected from the group consisting of ethylene/vinyl acetate, ethylene/acrylic acid and its ionomers, ethylene/methacrylic acid and its ionomers, ethylene/methyl acrylate, ethylene/ethyl acrylate, ethylene/isobutyl acrylate, ethylene/normal butyl acrylate, ethylene/isobutyl acrylate/methacrylic acid and its ionomers, ethylene/normal butyl acrylate/methacrylic acid and its ionomers, ethylene/isobutyl acrylate/acrylic acid and its ionomers, ethylene/normal butyl acrylate/acrylic acid and its ionomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate.

12. The composition of claim 11 wherein said copolymer of ethylene is selected from the group consisting of ethylene/vinyl acetate, ethylene/ethyl acrylate, ethylene/methyl acrylate, ethylene/isobutyl acrylate, ethylene/methyl methacrylate, and ethylene/vinyl acetate/methacrylic acid.

13. The composition of claim 12, wherein (a) said copolymer of ethylene is present in an amount of from about 12 to about 25 percent by weight; the ethylene content of said copolymer being from about 72 to about 88 percent by weight, the comonomer content of said copolymer being from about 12 to about 28 percent by weight, and the melt index of said copolymer being from about 1 to about 10; (b) said plasticizer is present in an amount of from about 4 to about 10 percent by weight when the filler is selected from the group consisting of calcium carbonate and hydrated alumina from about 3 to about 10 percent by weight when the filler is barium sulfate, wherein from 0 to about 20% by weight of said plasticizer is a plasticizer other than processing oil; (c) said filler is present in an amount of from about 65 to about 85 percent by weight when the filler is selected from the group consisting of calcium carbonate and hydrated alumina and from about 70 to about 90 percent by weight when the filler is barium sulfate; (d) said organic acid is present in an amount of from about 0.12 to about 0.5% by weight; and (e) said tackifier is present in an amount of from 0 to about 15% by weight.

14. The composition of claim 13 wherein said copolymer of ethylene is present in an amount from about 12 to about 25% by weight, and is a mixture of at least two copolymers of ethylene, copolymer (A) and copolymer (B), each copolymer having at least one polar comonomer selected from the group consisting of vinyl esters of saturated carboxylic acids wherein the acid moiety has up to 4 carbon atoms, unsaturated mono- or dicarboxylic acids of 3 to 5 carbon atoms, the salts of said unsaturated acids, and esters of said unsaturated acids wherein the alcohol moiety has 1 to 8 carbon atoms, copolymer (A) having a polar comonomer content of from about 10 to about 25 percent by weight, an ethylene content of from about 75 to about 90 percent by weight and a melt index of from about 0.5 to about 2 and wherein copolymer (B) has a polar comonomer content of from about 33 to about 60 percent by weight, an ethylene content of from about 40 to about 67 percent by weight and a melt index of from about 15 to about 100, and wherein the ratio of copolymer (A) to copolymer (B) is from about 95/5 to about 65/35, provided that the polar comonomer content of copolymer (B) is at least 18 percent by weight higher than the polar comonomer content of copolymer A.

15. The composition of claims 1, 2, 10, 13 or 14, in the form of a sound-deadening sheet.

16. A carpet having a backside coating consisting essentially of the composition of claims 1, 2, 10, 13 or 14.

17. An automotive carpet having a backside coating consisting essentially of the composition of claims 1, 2, 10, 13 or 14.

18. A foam, fabric, or scrim having a backside coating consisting essentially of the composition of claims 1, 2, 10, 13 or 14.

* * * * *

UNITED STATES PATENT OFFICE
CERTIFICATE OF CORRECTION

PATENT NO. : 4,434,258
DATED : February 28, 1984
INVENTOR(S) : Frederick G. Schumacher, Walter Yllo It is certified that error appears in the above-identified patent and that said Letters Patent are hereby corrected as shown below:

Column 4, line 59, "acid" should read -- and --.

Table 3, column 17, Ex. No. 19, "1.88" should read -- 1.89 --.

Table 3, column 17, Ex. No. C5, "1.87" should read -- 1.88 --.

Table 3, column 17, Ex. No. 20, "1.88" should read -- 1.87 --.

Table 3, column 17, Ex. No. C6, "1.89" should read -- 1.88 --.

Table 3, column 17, Ex. No. 21, "1.87" should read -- 1.89 --.

Table 3, column 17, Ex. No. C7, "1.85" should read -- 18.5 --.

Table 3, column 17, Ex. No. 22, "1.85" should read -- 18.5 --.

Table 6, column 21, Ex. No. 46, "355" should read -- 335 --.

Signed and Sealed this

Thirty-first Day of December 1985

[SEAL]

Attest:

DONALD J. QUIGG

Attesting Officer  Commissioner of Patents and Trademarks